April 18, 1933.  R. N. CUNDALL  1,904,652
WEIGHING AND FILLING MACHINE
Filed Aug. 7, 1930   8 Sheets-Sheet 3
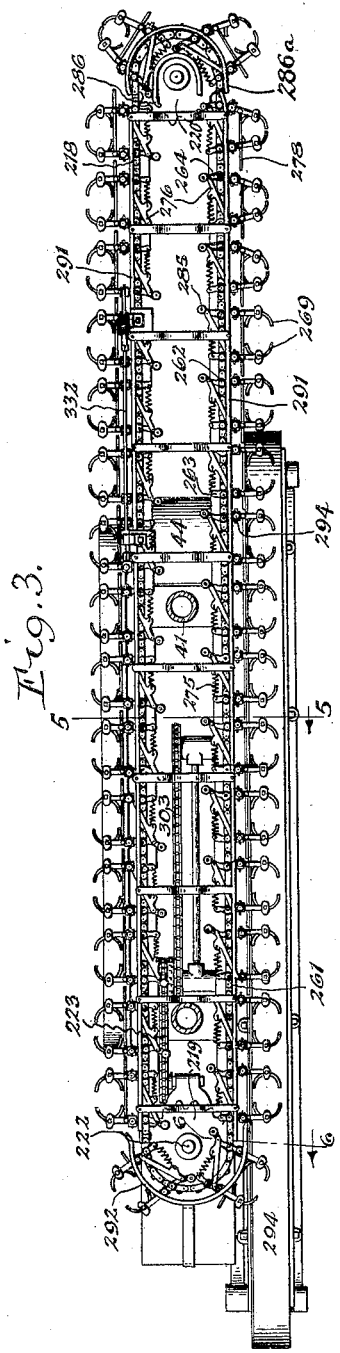
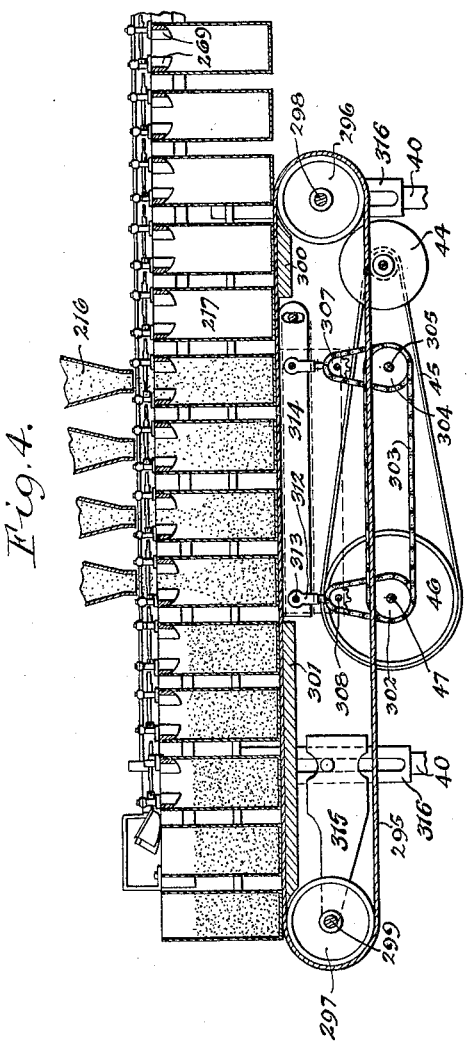
Inventor
Robert N. Cundall
by Popp & Powers
Attorneys

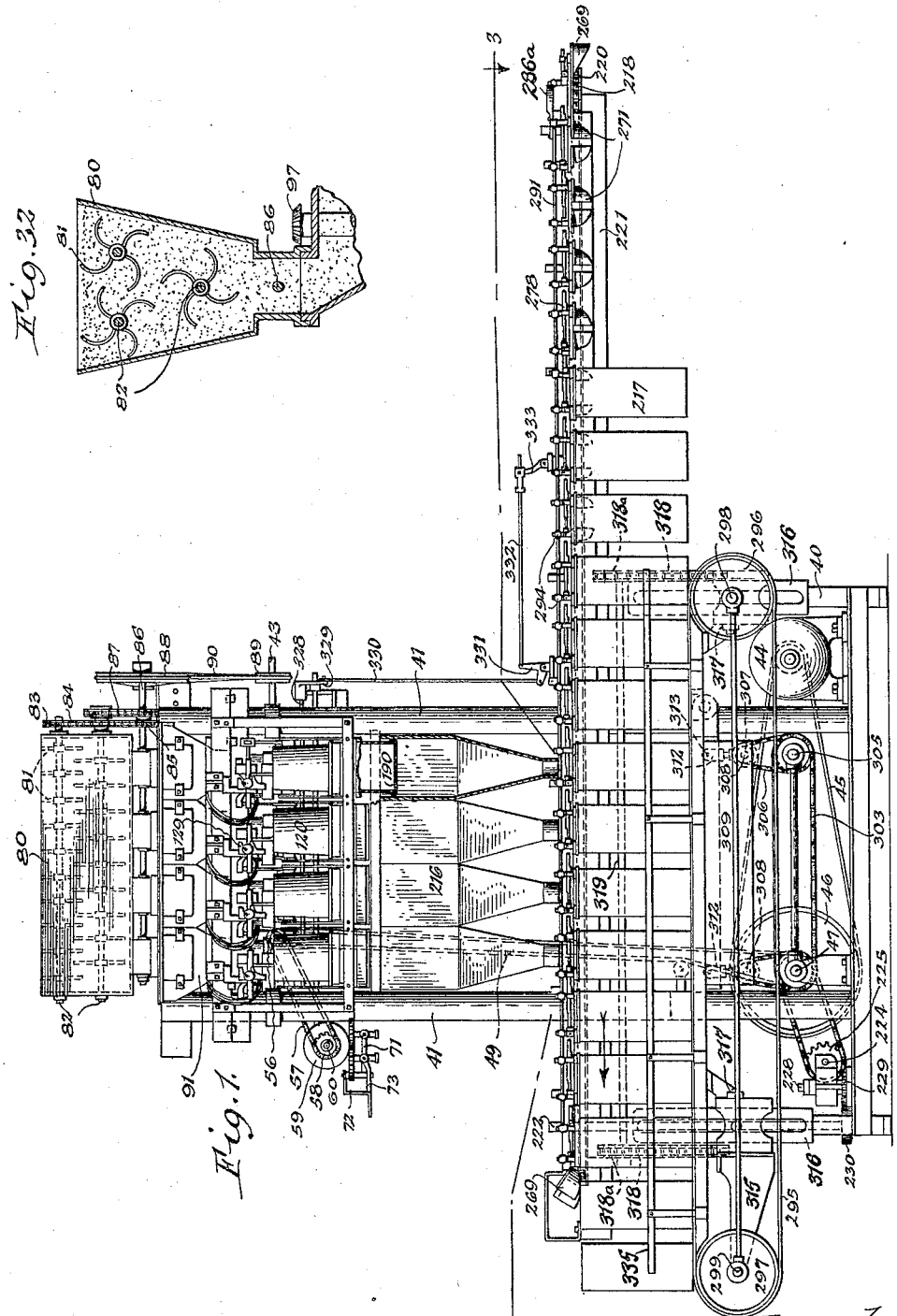

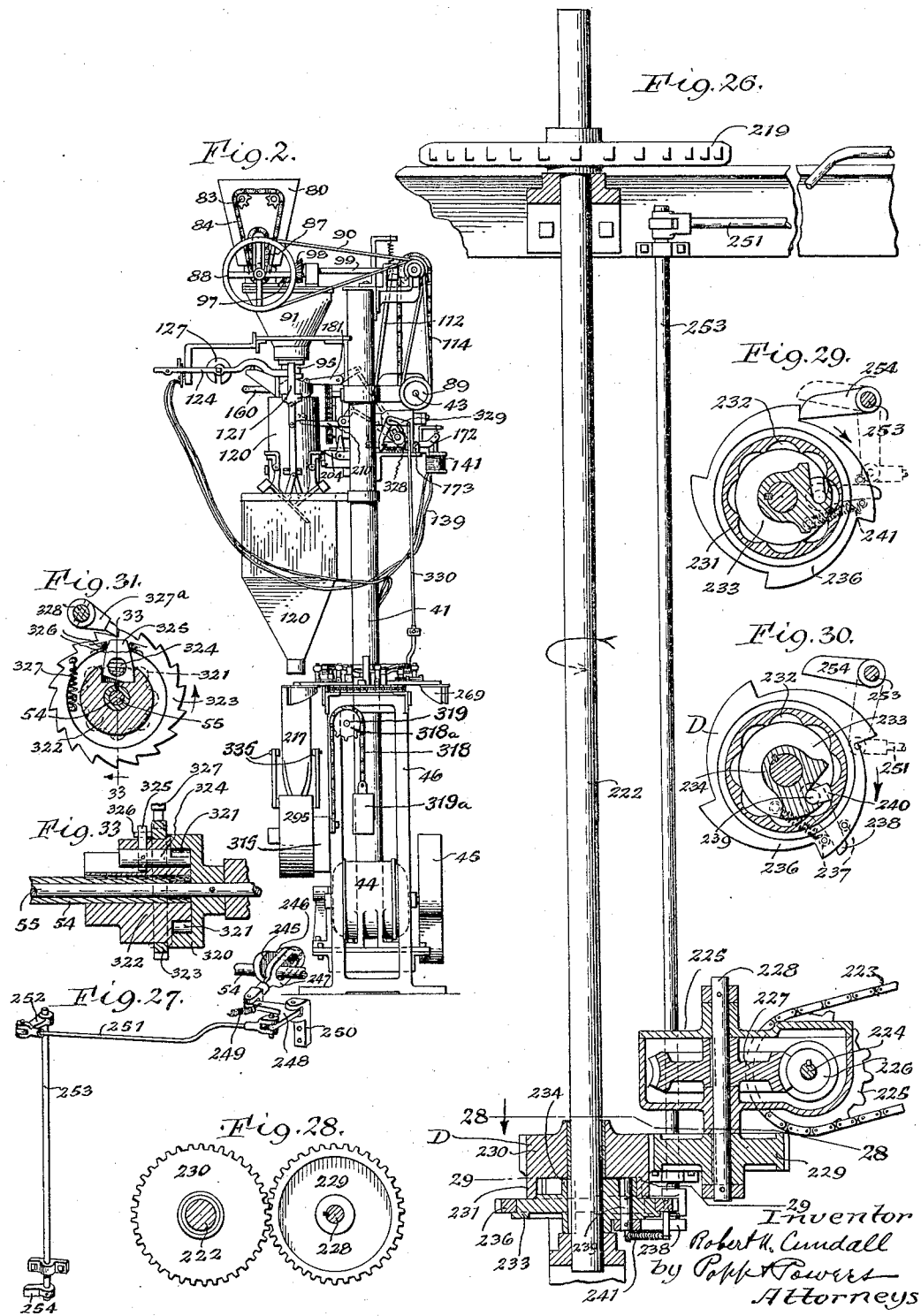

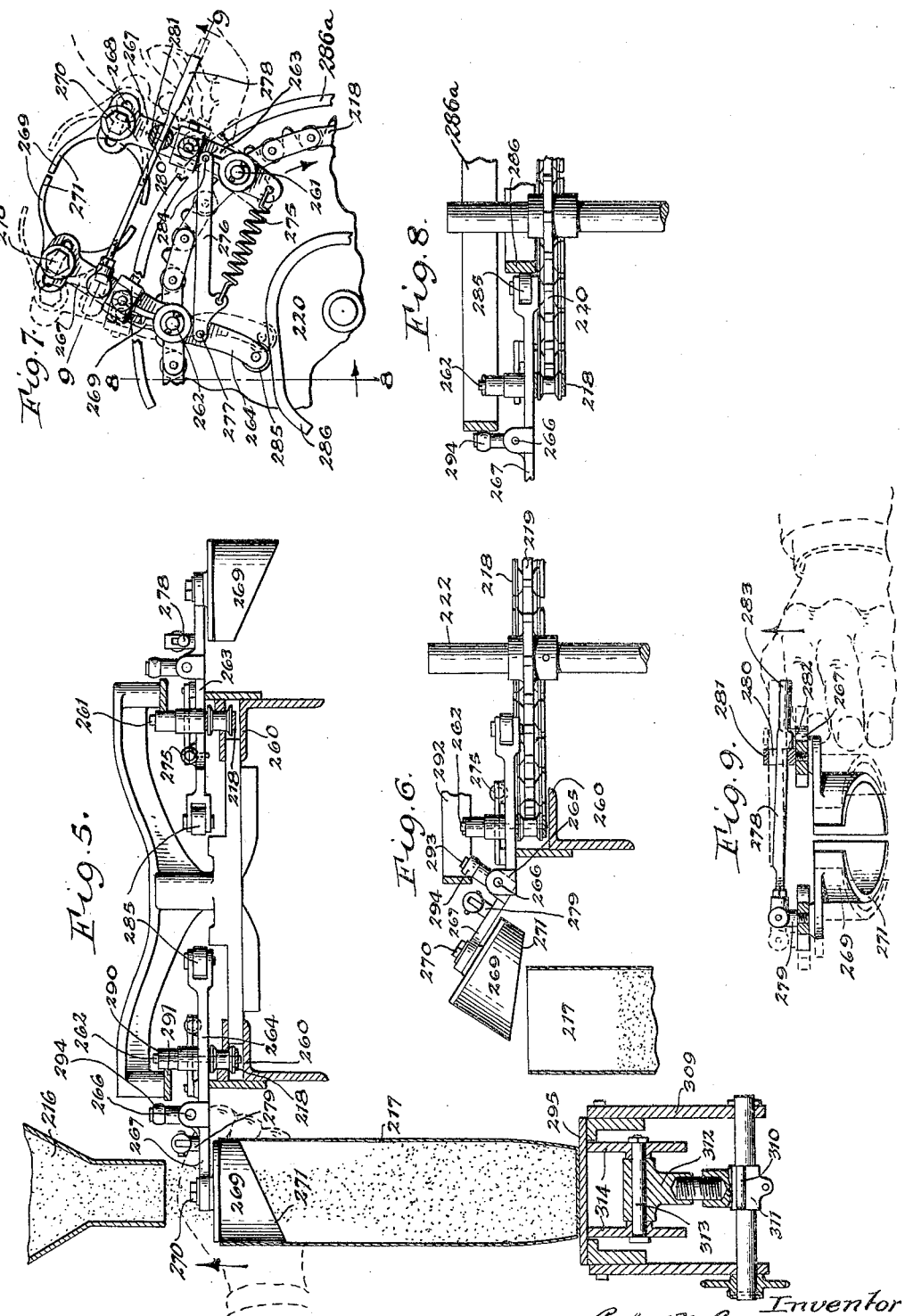

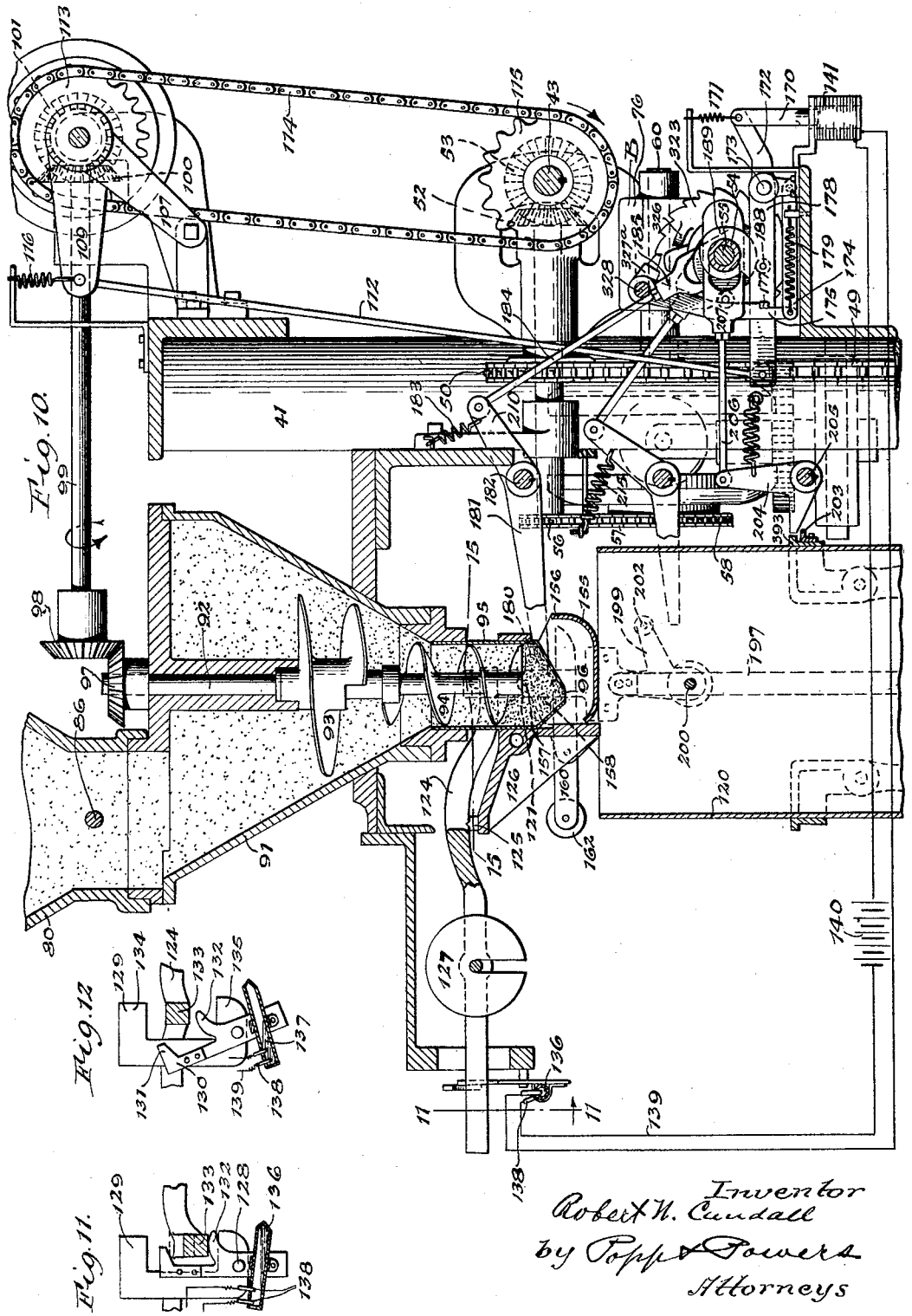

April 18, 1933.  R. N. CUNDALL  1,904,652
WEIGHING AND FILLING MACHINE
Filed Aug. 7, 1930  8 Sheets-Sheet 6
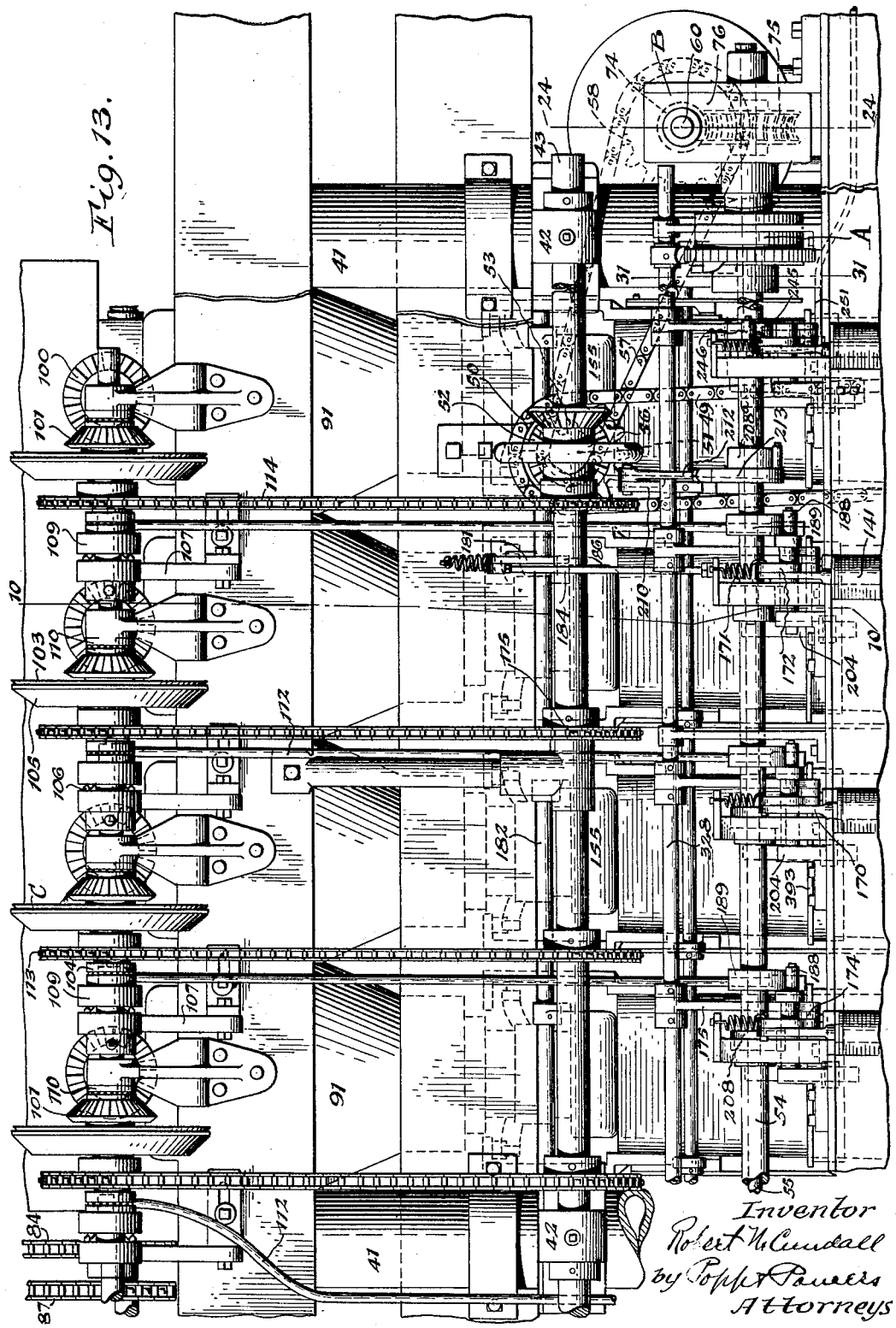
Inventor
Robert N. Cundall
by Poppet Powers
Attorneys April 18, 1933.  R. N. CUNDALL  1,904,652
WEIGHING AND FILLING MACHINE
Filed Aug. 7, 1930  8 Sheets-Sheet 7
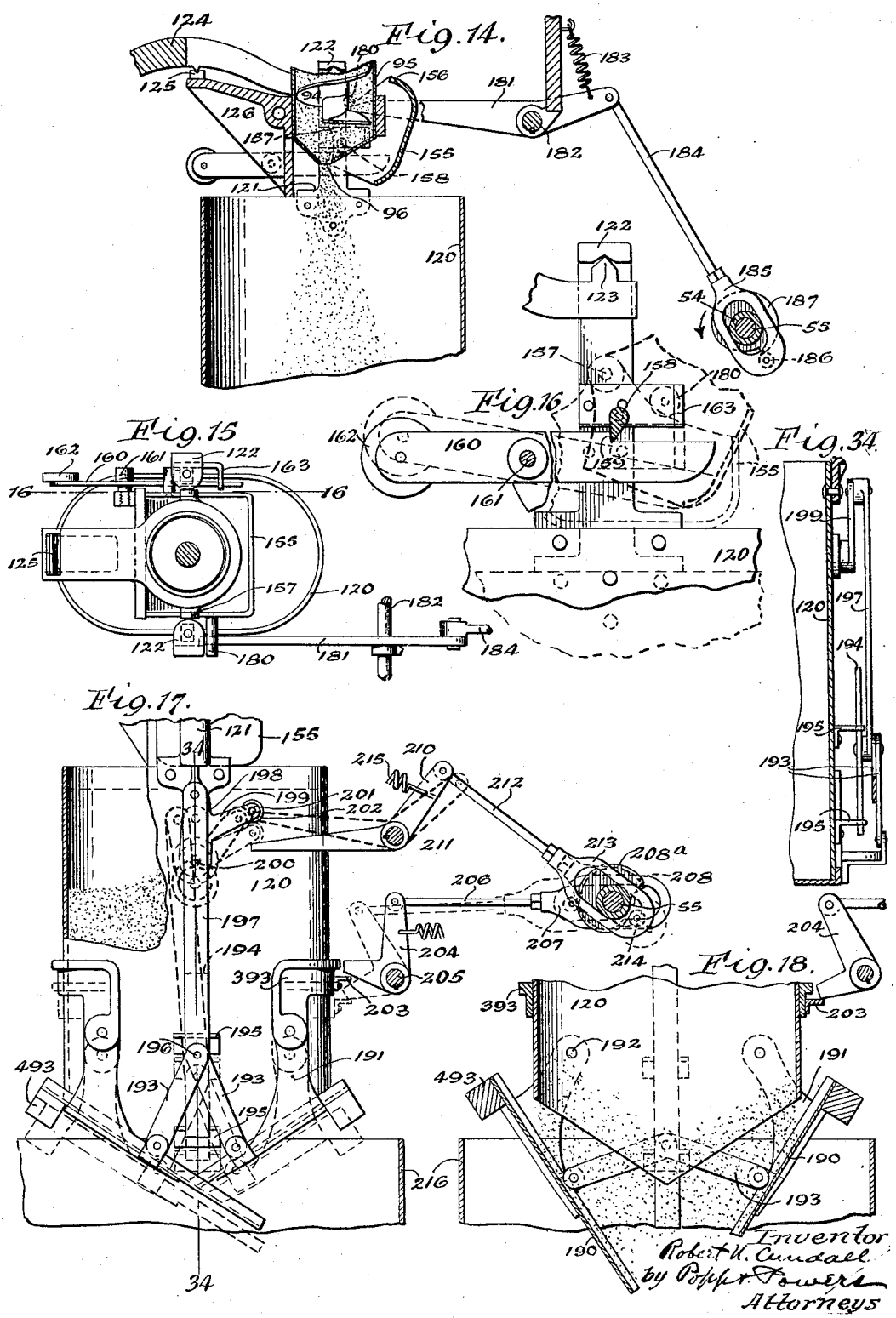

April 18, 1933. R. N. CUNDALL 1,904,652
WEIGHING AND FILLING MACHINE
Filed Aug. 7, 1930  8 Sheets-Sheet 8
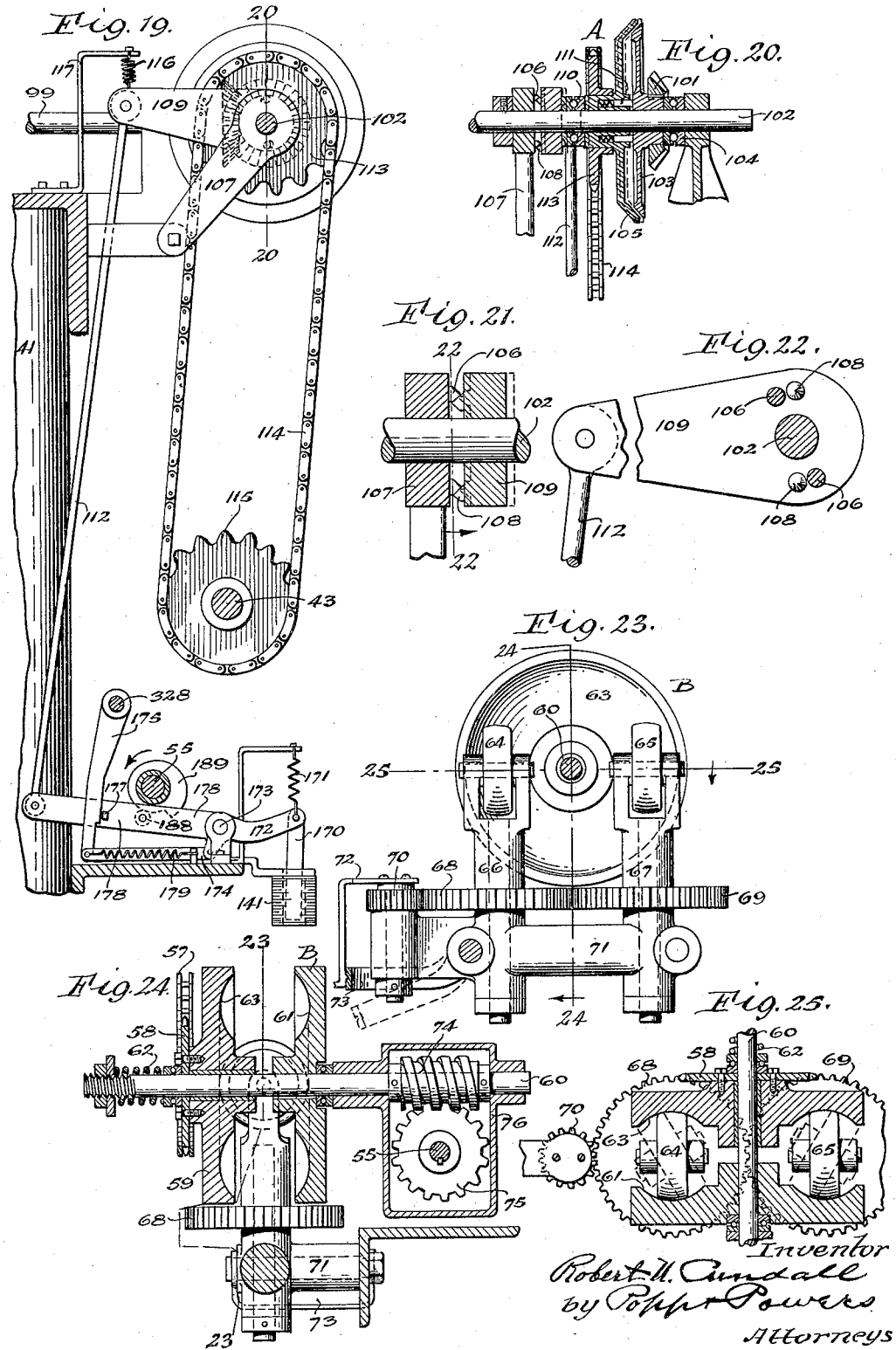

Patented Apr. 18, 1933

1,904,652

UNITED STATES PATENT OFFICE

ROBERT N. CUNDALL, OF EAST HAMBURG, NEW YORK, ASSIGNOR TO CONSOLIDATED PACKAGING MACHINERY CORP., OF BUFFALO, NEW YORK, A CORPORATION OF NEW YORK

WEIGHING AND FILLING MACHINE

Application filed August 7, 1930. Serial No. 473,535.

This invention relates to a weighing and filling machine and more particularly to a full automatic weighing machine for filling containers such as bags with such substances as flour, arsenate of lead powder, and other finely ground powders that are generally known as non-free flowing, although the features of the present invention can also be embodied in other machines for handling such substances and for handling free flowing substances.

One of the objects of this invention is to provide a full automatic filling and weighing machine of this character which weighs and fills a succession of containers fed to it, and a plurality at one time, in which all but the actual cutting off of the flow of powder into the weighing devices is effected by a positively driven continuously rotating cam shaft and in which the resetting of the cut off and feeding mechanism to discharge another series of batches to the weighing means is also effected by the same cam shaft. By the provision of such a controlling cam shaft synchronized with the flow of powder into the weighing devices and with the cut off devices for such flow, accurate weights are obtained and at the same time all of the mechanisms are positively reset, and all but the actual cut off and feeding mechanisms set into operation in their proper order by the continuously rotating synchronized cam shaft.

Another object of the present invention is to provide such a full automatic weighing and filling machine which will automatically and simultaneously measure a plurality of exactly uniform weights of non-free flowing materials and deposit them in containers so that each container has the exact weight of every other container thereby avoiding short weight or loss of profits through excess weight. To accomplish this with non-free flowing materials has involved a distinct departure from existing principles heretofore employed in machines of this character in the powder feeding mechanism; the weighing mechanism; the cut off mechanism actuated by the weighing mechanism, and cutting off the flow of material from the feeding mechanism to the weighing bucket; the mechanism for discharging the weighted amounts of powder from the weighing buckets; the receptacle holding and carrying means; the means for actuating the receptacle feeding means in timed relation to the discharge mechanism and the mechanism for securing synchronous operation in each of these mechanisms to secure full automatic operation of the machine.

More specifically, the invention proposes a type of a synchronized and positively started and stopped screw feed for insuring that the stream flowing into the weighing bucket be absolutely uniform in cross section and without voids or pockets, this being absolutely necessary to insure an exact weight of material in the bucket when the stream is interrupted. The cut off mechanism which interrupts this flow is also designed to cut off the flow of material when the exact weight of the powder in the weighing bucket is obtained. Means are provided for latching this cut off gate in its open position; and a simple means is provided directly on the weighing bucket for releasing this latching means when the cut off mechanism is to be actuated to cut off the stream of material to the bucket. In the mechanism for discharging the weighed amounts of material from the weighing buckets, mechanically actuated gates are provided, the weight alone of the material in the buckets being insufficient to actuate them; the operation of these gates is effected from the same cam shaft which effects the starting of the powder feeding mechanism, these operations being synchronized, and means are also provided for positively holding the weighing bucket down when the discharge gates are being opened to insure positiveness in its action. In the means for bringing the bags in position to receive the weighed portions of material an endless chain is provided which carries a series of jaws which hold the mouths of the bags; means are provided for opening the jaws when the bags are slipped over the same so that the bags are automatically held by their mouths, means are provided for moving the conveyer in synchronism with the feeding and weighing operations to bring a plurality of bags automatically into position to receive the weighed portions of material, this synchronization being obtained through the same cam shaft which controls the other mechanisms; means are provided for automatically closing these jaws and lifting the jaws from the bags after the bags have been removed and means are provided for shaking the bags as they are being filled so that the powder will settle uniformly in the bags.

Another object is to provide a machine of this character in which the elements are actuated from a constantly rotating power source and are, with the exception of the powder feeding mechanism and cut off mechanism, controlled in their operation by a constantly rotating cam shaft, the synchronized movements of all the parts being obtained through the movement of this cam shaft which is synchronized to the filling of the weighing buckets with the predetermined weights of the material. By this provision of a cam shaft control of all mechanisms incidental to the actual stopping of the flow of material, greater accuracy in the operation of the machine is obtained; complications are avoided, the machine is more easily adjusted and repaired, and the machine can be made with greater simplicity and at lower cost.

A further purpose is to provide such a continuously rotating driving means and synchronized controlling cam shaft in which means are provided for varying the relative speeds of the driving means and cam shaft. By this means, the machine can be readily adjusted to suit materials having greater or less non-free flowing characteristics and also to climatic conditions, dampness greatly reducing the flowing qualities of powdered materials.

Other aims are to provide such a machine which is simple and inexpensive in construction, considering the function which it performs, is reliable and accurate in its operation and will not get out of order under conditions of severe and constant use.

In the accompanying drawings, Figure 1 is a side elevation of an automatic weighing and filling machine embodying my invention and showing a succession of bags being filled thereby.

Figure 2 is an end view thereof viewed from the right hand or feeding end of the machine as shown in Fig. 1.

Figure 3 is a section taken on line 3—3, Fig. 1.

Figure 4 is a fragmentary, vertical, longitudinal section through the series of bags being filled and showing the mechanisms for shaking the bags while being filled.

Figure 5 is a fragmentary, vertical, transverse section taken on line 5—5, Fig. 3.

Figure 6 is a similar section taken on line 6—6, Fig. 3, and showing the bag holder being withdrawn for the mouth of a filled bag.

Figure 7 is a fragmentary, enlarged top plan view similar to Fig. 3, showing the manner in which the jaws of the bag holders are closed preparatory to receiving an empty bag.

Figure 8 is a vertical, transverse section taken on line 8—8, Fig. 7.

Figure 9 is a section through one of the bag holders taken on line 9—9, Fig. 7, and showing the manner in which it is released to receive the mouth of a bag.

Figure 10 is a fragmentary, vertical, transverse section taken on line 10—10, Fig. 13, and through the filling and weighing machine embodying my invention and showing in particular the feeder and compression screws and the manner in which they are started and stopped.

Figure 11 is a section taken on line 11—11, Fig. 10, and showing the front end of the scale beam depressed as when the weighing bucket is empty.

Figure 12 is a similar view showing the mercury latch shown in Fig. 11 in the position in which it closes the electrical circuit in response to a predetermined weight of powder in the accompanying weighing bucket.

Figure 13 is a fragmentary rear elevation of the machine.

Figure 14 is a fragmentary, transverse, vertical section similar to Fig. 10 showing a cut off gate in its open or inoperative position.

Figure 15 is a section taken on line 15—15, Fig. 10, and showing the feeder screw, cut off gate and associated parts.

Figure 16 is a section taken on line 16—16, Fig. 15, and showing the manner in which the cut off gate is latched in its inoperative position.

Figure 17 is a fragmentary, vertical, transverse section showing in elevation one of the weighing buckets and the mechanism for opening and closing its discharge doors.

Figure 18 is a fragmentary, vertical, transverse section through one of the weighing buckets and its discharge doors.

Figure 19 is an enlarged, vertical, fragmentary, transverse section through the main drive shaft, the controlling cam shaft, and showing in elevation the clutch which controls the feeding and compression screws.

Figure 20 is a section taken on line 20—20, Fig. 19.

Figure 21 is an enlarged section similar to Fig. 20 showing the cam arm which controls the clutch shown in Fig. 20.

Figure 22 is a section taken on line 22—22, Fig. 21.

Figure 23 is a fragmentary, vertical, longitudinal section taken on line 23—23, Fig. 24.

Figure 24 is a fragmentary, vertical, transverse section taken on line 24—24, Figs. 13 and 23.

Figure 25 is a section taken on line 25—25, Fig. 23.

Figure 26 is a fragmentary, vertical, longitudinal section through the drive shaft for the bag conveyer chain and showing the clutch and drive associated therewith.

Figure 27 is a perspective view of the mechanism for actuating the clutch controlling the bag conveyer chain from the main cam shaft.

Figure 28 is a section taken on line 28—28, Fig. 26.

Figure 29 is a horizontal section taken on line 29—29, Fig. 26.

Figure 30 is a view similar to Fig. 29 showing the controlling dog 254 retracted to an operative position.

Figure 31 is a section taken on line 31—31, Fig. 13 and is similar to Figs. 29 and 30 of the clutch A and controls the starting and stopping of the entire machine.

Figure 32 is a fragmentary, vertical, transverse section through the receiving reservoir in which the powder is initially placed.

Figure 33 is a vertical, longitudinal section on line 33—33, Fig. 31 through the main stopping and starting clutch shown in Fig. 31.

Figure 34 is a fragmentary section taken on line 34—34, Fig. 17, and showing the mechanism for opening and closing the discharge doors of the weighing buckets.

General organization

In its general organization, this invention includes a rotating driving means including a drive shaft, a constantly rotating main controlling cam shaft synchronized with said drive shaft, means for adjustably varying the speed at which said cam shaft is driven from the drive shaft, a plurality of weighing buckets supported on scale beams, means for positively feeding streams of material of uniform cross section into said buckets, electro-magnetic means associated with each scale beam for stopping the streams of powder to and cutting off the streams of powder to said buckets through the movement of said scale beams when a predetermined weight of powder has flowed into the bucket, and means for actuating, from the movement of said cam shaft, (1) the opening of the cut off gate for restoring the flow of material to the bucket, (2) the gates for discharging the weighed powder from said bucket and (3) the conveyer for moving the filled bags away and bringing empty bags into position to receive the next succeeding discharge or discharges of the material and (4) the starting of the feeding screws.

In the machine shown, four bags are filled at the same time and consequently four counterpart mechanisms are shown for effecting the simultaneous filling of the four bags. A description of one of these mechanisms will be deemed to apply to the other mechanisms.

The main driving and controlling mechanism

The elements of the machine are carried by a frame which consists of a base portion 40 having the usual legs and cross members and carries the bag supporting and conveying mechanism and two tubular posts 41 which rise from the base 40 and support the weighing and filling machine. Supported in suitable bearings 42 from the posts 41 is a main drive shaft 43 for the weighing and filling mechanism. This main drive shaft 43 is continuously rotated through the following power drive:

As best shown in Figs. 1 and 4, a motor 44 is mounted on the base 40 and by means of a belt 45 drives a pulley 46 fast on a shaft 47. This shaft 47 carries a sprocket on which is arranged a long vertical chain 49 which drives a pinion 50 mounted on a shaft 51 and which shaft carries a beveled gear 52, as best shown in Figs. 10 and 13. This beveled gear 52 meshes with a beveled gear 53 on the main drive shaft 43 so that this shaft is continuously rotated.

The control of the elements to effect the filling and weighing operations with the exception of the actual stopping and cutting off of the feed of powder to the weighing buckets is effected by a hollow cam shaft or sleeve 54 which is mounted on and continuously rotated by a shaft 55, the driving connection between this shaft 55 and cam shaft 54 comprising a clutch A. This shaft 55 which carries and drives the cam shaft 54 is continuously driven in synchronism with the main drive shaft 43 through a variable speed gearing B as follows:

As best shown in Figs. 10 and 13 a sprocket 56 is provided on the shaft 51 which drives the main drive shaft 43. This sprocket 56 through a chain 57 drives a sprocket 58 which, as best shown in Fig. 24 is fast to the driving disk 59 of the variable speed gearing B. This driving disk 59 is loose on a shaft 60 and is urged toward a counterpart driven disk 61 by a spring 62. The opposing faces of these disks 59 and 61 are provided with curved concentric annular recesses 63 which receive the peripheries of two swinging pulleys 64 and 65 which are pivoted central to the curves on yokes 66 and 67 and to which yokes intermeshing gears 68 and 69 are secured. With this form of variable speed transmission, it is apparent that by turning either of the gears 68 or 69, the pulleys 64 will be swung so that their peripheries engage, respectively, the outer or marginal part of the groove 63 in the driving disk, and the inner part of the groove 63 in the driven disk 61, as shown by dotted lines in Fig. 25, in which case the driven disk 61 will be rotated at slower speed than the driving disk 59; the pulleys will be swung to the full line perpendicular position shown in Fig. 25 in which case the speeds of the driving and driven disks will be the same or the pulleys will be swung so that their peripheries engage with the outer or marginal part of the groove 63 of the driven disk 61 and the inner or central part of the groove 63 of the driving disk in which latter case the driven disk 61 will be driven at a greater speed than the driving disk. The means for thus turning the gears 68 and 69 to vary the relative speeds of the driven and driving disks 61 and 59 comprise a small pinion 70 which is carried by the same bracket 71 which also carries the yokes 66 and 67 and their gears 68 and 69 and pulleys 64 and 65. This pinion 70 meshes with the gear 68 and carries an arm 72 by means of which it is manually turned. The arm 72 is held in the desired position of adjustment by a bail 73 which is adapted to be moved into engagement with the arm 72 in any of its adjusted positions and hold it in such position.

The driven disk 61 of the variable speed transmission B just described is keyed to the shaft 60 and the motion of this shaft is transmitted to the shaft 55 carrying the cam shaft 54 by a worm 74 (Fig. 24) meshing with a worm gear 75 fast to the shaft 55. These are enclosed in a housing 76.

*The material compacting and feeding mechanism*

In any automatic weighing scale which is fed with a stream of flowing material and which interrupts this stream when the predetermined amount has flowed into the weighing bucket or buckets, it is necessary that the flowing stream be absolutely uniform in cross sections at all times in order to obtain accurate weight. The reason for this is very evident because the interrupting means or cut off gate, cuts off this stream while a portion is still in the air. For example, if five pounds of material is being weighed, the scale is adjusted to balance at 4¾ pounds, it having been determined that the other ¼ pound is in the stream of material flowing from the cut off gate into the bucket. If under these conditions the stream is not uniform this last interval of weight namely ¼ pound, may vary as much as several ounces.

To get this uniformity of flow it has been necessary to discard all forms of feeders such as paddles, stirrers, shafts with spikes, etc. and adopt a positive feed for which a screw feed has been found most satisfactory.

The powdered material to be weighed and bagged is contained in a cast iron receiving reservoir 80 which, as shown in Figs. 1 and 32, is arranged at the top of the machine and provided with inclined front and rear walls. The powder in this receiving reservoir is agitated by a plurality of agitators 81 mounted on three longitudinal shafts 82. These shafts are journaled in the end heads of the receiving reservoir 80 and the upper two shafts carry sprockets 83 which carry a drive chain 84 meshing with a sprocket 85 on a shaft 86, and the lower shaft 82 also has a sprocket and chain connection 87 with this shaft 86. This shaft is continuously rotated by means of a pulley 88 on the shaft 86 and a pulley 89 on the main drive shaft 43, these pulleys being connected by a belt 90. From the foregoing it is apparent that all of the agitators 81 are rotated continuously from the main drive shaft.

The receiving reservoir 80 feeds into a plurality of lower bowls 91, four of such bowls being shown, four bags being filled at the same time by the machine. As best shown in Fig. 10 each of these bowls is of tapering or conical form and within each is arranged a vertical central spindle 92. This spindle is intermittently driven, as hereinafter described, and carries within the bowl an upper large compression screw 93 having about 1½ turns. This compression screw has about a ¼ inch clearance from the sides of the bowl. This compression screw forces the powder down into the field of a feeder screw 94 which is mounted on the same spindle 92 and is of smaller diameter. Since the compression screw 93 is of larger diameter than the feeder screw it will, of course, force down more powder than the feeder screw 94 will carry away. This excess powder flows back through the clearance between the compression screw 93 and the bowl 91 and is resisted by the head of material in this bowl. It is apparent that with these cooperating screws, all air pockets are compressed out of the powder and a solid column of powder is fed by the feeding screw 94.

Each of the feeding screws 94 operates in a tubular nozzle 95 which is fitted to the outlet at the lower end of the corresponding bowl 91 and the lower end of the nozzle is constricted to provide a small opening 96 which further tends to provide a stream of powder of absolutely uniform cross section from the nozzle 95.

Each of the four spindles 92 in each bowl 91 has a beveled gear 97 at its upper end which meshes with a beveled gear 98 on a cross shaft 99. These cross shafts are suitably journaled on the machine frame and each carries a beveled gear 100 at its rear end which meshes with a beveled gear 101 on a clutch shaft 102. This clutch shaft 102 is stationary and as best shown in Fig. 13 carries four friction clutches C each of which transmits power from the main drive shaft 43 to the beveled gears 100 and 101 which drive the spindles 92 and their screws. As best shown in Figs. 20–22, each of these friction clutches C is constructed as follows:

The beveled gear 101 is fast on the driven disk 103 of the clutch and a suitable thrust bearing 104 is provided between this driven clutch disk 103 and an adjacent stationary bracket which supports the stationary clutch shaft 102. The driving clutch disk 105 is also loose on the stationary clutch shaft 102 and is slidable into engagement with the driven clutch disk 103 to transmit power. This movement of the driving clutch member is effected by a pair of conical teeth 106 on opposite sides of one face of a stationary bracket 107 which teeth are engaged by a corresponding pair of conical teeth 108 on the opposing face of an arm 109 also loosely mounted on the shaft 102. A thrust bearing 110 is provided between the opposite or untoothed side of the arm 109 and engaging the hub of the driving clutch disk 105 spring loaded plungers 111 are provided for returning the driving clutch member 105 or disengaging it from the driven clutch member. The upward and downward movement of the arm 109 to open and close each clutch C is effected by a shipper rod 112 and the driving clutch disk 105 is driven by means of a sprocket 113 fast on its hub and connected by a chain 114 with a sprocket 115 fast on the continuously rotating main drive shaft 43, as best shown in Figs. 13 and 19. A spring 116 connects the end of each clutch arm 109 with a bracket 117 and tends to hold each arm 109 in its elevated position in which the clutch is open.

From the foregoing description of each of the four clutches C, it is apparent that when any of the shipper rods 112 (Fig. 19) is depressed the arm 109 is depressed causing the tapered pins 108 and 106 (Fig. 22) to engage and wedge the driving clutch disk 105 into engagement with the driven clutch disk 103 (Fig. 20) whereby power is then transmitted from the continuously rotating main drive shaft 43, (Fig. 19) sprocket 115, chain 114, sprocket 113, driving clutch disk 105 (Fig. 20), driven clutch disk 103, beveled gears 101, 100 (Fig. 13) cross shaft 99, beveled gears 98 and 97, vertical screw shaft 92, thereby operating the screws 93 and 94. When any of the shipper rods 112 is released, the spring 116 raises the shipper rod 112 and the reverse operation takes place, the corresponding clutch C is opened and the movement of the screws 93 and 94 is stopped.

The weighing mechanism

Below each of the nozzles 95 of each bowl 91 is arranged a weighing bucket indicated generally at 120, four of such buckets being shown. Each of these weighing buckets is of cylindrical form and has discharge gates at its bottom, as hereinafter described. On opposite sides of each bucket 120 upwardly extending brackets 121 are provided, and as best shown in Fig. 16, each of these brackets is formed at it upper end to provide inwardly extending ears 122 which are notched on their undersides to provide a seat for a knife bearing 123 at each end of a bifurcated scale beam 124. This scale beam 124 is balanced on a knife bearing 125 from a bracket 126 and its forwardly projecting end is counterbalanced by a poise weight 127, as best shown in Fig. 10.

The movement of each scale beam 124 in response to a weight of powder in its bucket 120 determined by the poise weight 127, operates a mercury switch which is constructed as follows:

As best shown in Figs. 11 and 12 pivotally mounted at 128 to a stationary bracket 129 is a vertically swinging bar 130 having an upper rearwardly extending jaw 131 having an inclined under face and a lower rearwardly extending jaw 132 having a rounded upper face. The scale beam 124 is formed to provide a projection 133 which is adapted to strike the lower jaw 132 in its downward movement and move the bar 130 to its upright position shown in Fig. 11 and in its upward movement strikes the inclined under surface of the upper jaw 131 and moves the bar 130 to its tilted position shown in Fig. 12. The movement of the scale beam 124 in either direction is limited by jaws 134 and 135 formed in the fixed bracket 129. Below the pivot 128, the bar 130 carries a glass tube 136 which contains a quantity of mercury 137. Molded in the front end of this glass tube 136 is a pair of spaced terminals 138 which connect with wires 139. These wires are in circuit with a battery 140 and also with a solenoid 141, as shown in Fig. 10. It is therefore apparent that when the weight of powder in one of the buckets 120 raises the front end of the scale beam 124 the predetermined extent, the projection 133 on the front end of the scale beam 124 will strike the upper jaw 131 of the mercury switch bar 130 and tilt this bar into the position shown in Fig. 12. In this position the mercury 137 bridges the contacts 138 and closes the circuit through the wires 139, battery 140 and solenoid 141.

The cutting off mechanism

When a predetermined amount of powder has flowed into each of the weighing buckets, the compression and feeder screws are stopped and the streams of powder in the air are cut off. Both of these operations are effected directly in response to the depression of the weighing buckets to a predetermined weight so that absolute accuracy in weights results.

The cutting off of the stream of powder in the air is effected by a cut off gate 155 which, as best shown in Fig. 14 is cupped and provided with rising sides 156. The sides 156 are each pivoted at 157 to that part of the bracket 126 embracing the nozzle 95 and is pivoted forward of its center so that its tendency, when released is to swing under the flowing stream of powder from the nozzle 95 and cut off the stream of powder flowing into the weighing bucket 120. On the side of each of the cut off gates 155 a catch pin or tooth 158 is rigidly secured, this tooth being adapted to engage with a notch 159 of a swinging latch bar 160 which is pivoted at 161 and counterweighted as at 162. The pivotal connection 161 is between the latch bar 160 and the bracket 126 and as this bracket is stationary, the only movement of the latch bar 160 is rotative about its pivot 161. On the adjacent arm 121 of each weighing bucket 120, an L-shaped abutment 163 is secured, this abutment extending over the rear end of the latch bar 160 and being adapted to strike the latch bar. With this organization, as best shown in Fig. 16, as the weighing bucket 120 settles the abutment strikes the rear end of the latch bar 160 and depresses the latch bar 160 until the catch pin 158 clears the notch 159. When the catch pin 158 clears the notch 159, the cut off gate 155 is released and swings under the stream of powder from the constricted orifice 96 so as to cut off the stream of powder flowing into the weighing bucket 120 while it is still in the air.

Contemporaneous with the cutting off movement of the cut off gate 155, the compression and feeder screws 93 and 94 must, of course, stop since otherwise the powder would continue to flow into the cut off gate. These screws are stopped through the energization of the solenoid 141 from the closing of the circuit through the mercury latch which, as previously explained closes the circuit when the predetermined weight of powder has flowed into the corresponding weighing bucket.

The solenoid 141 has a movable core 170 which, when the corresponding bucket is filled with its proper weight of powder and the solenoid is energized, is drawn downwardly against the resistance of the spring 171. This downward movement of the core 170 rotates a bell crank lever 172 about a fixed pivot 173 and the lower arm of this bell crank lever 172 moves a link 174 longitudinally forward. The front end of this link 174 is pivotally connected to a latch arm 175 which is loosely hung upon a rock shaft which performs an entirely separate function as hereinafter described. On its rear side this latch arm 175 is provided with an undercut notch or shoulder which is adapted to engage a lug 177 upon the side of a lever 178 which is also pivoted on the pin 173 and is pivotally connected at its front end to the shipper rod 112. The latch bar 175 is yieldingly held in engagement with the lug 177 by a spring 179 which is connected at its rear end to a stationary part of the machine frame and at its front end is connected to the pivotal connection between the latch arm 175 and the link 174.

Assuming that the bucket has been filled and the cut off gate 155 released to cut off the further flow of powder to the weighing bucket, at the same time that this takes place, the downward movement of the weighing bucket 120 elevates the front end of its scale beam 124 (Fig. 10) and causes it to strike the upper jaw 131 of the bar 130. This tilts the bar 130, causes the mercury 137 to flow forwardly and close the circuit between the contacts 138 in the glass tube 136 and thereby establish a circuit through the battery 140, wires 139, and solenoid 141. The energization of the solenoid 141 causes its movable core to be moved downwardly thereby rotating the bell crank lever 172. This rotation moves the link 174 and latch arm 175 forwardly so as to disengage the lug 177 from the latch arm 175 and permit the spring 116 to elevate the shipper rod 112 and the lever 178. The spring 116 thereupon rotates the arm 109 upwardly, which, as shown in Figs. 20—22 moves the pins 106 and 108 out of engagement with one another. This permits the spring loaded plungers 111 to move the continuously rotating driving clutch disk 105 out of engagement with the driven clutch disk so that the power is cut off to the driven clutch disk 103, beveled gears 101 and 100 (Fig. 10), shaft 99, beveled gears 98 and 97, spindle 92 and compression and feeder screws 93 and 94. When these screws stop rotating, as described, it is apparent that the flow of powder through the nozzle 95 is stopped so that there is no tendency for the powder to pile up on the closed cut off gate 155.

*The resetting of the cutting off mechanism.*

After the powder has been dumped from each weighing bucket 120, as hereinafter described, the filling mechanism associated with it must again be started to fill the weighing bucket with powder. This resetting of the feeder screw 94 in operation and the withdrawal of the cut off gate 155 to an inoperative position is effected by the main cam shaft 54, which, as previously described, is synchronized with the main drive shaft so as to give ample time for the contents of each weighing bucket to be dumped and the buckets each restored to their unweighted elevated positions.

The cut off gate 155, as best shown in Fig. 15 is provided at one side with a pin 180 which is engaged by the front end of a lever 181, which lever is pivoted at its center at 182 (Fig. 14). The front end of this lever 181 is normally held depressed by a spring 183 connecting the rear end of this lever and an adjacent part of the machine frame. The rear end of this lever 181 is pivoted to a cam rod 184 the lower end of which is secured to a slotted head 185 which embraces the hollow or main cam shaft 54. Each of the slotted heads carries a roller 186 which engages the periphery of a snail cam 187 on the cam shaft 54. This snail cam is so adjusted in position that after the dumping of each weighing bucket the continuous rotation of the cam shaft 54 causes the snail cam 187 to move the roller 186 downwardly thereby reciprocating the cam rod 184 downwardly against the resistance of the spring 183. This elevates the front end of the lever 181 and causes it to engage under the pin 180 and raise the cut off gate 155 to the elevated position shown in Fig. 14. In this position, the gate is out from under the restricted orifice 96 in the nozzle 95 so that the powder is free to fall therefrom into the weighing bucket.

At the same time the feeder and compression screws 94 and 93 must start operating to force a uniform flow of powder into the weighing bucket. At this time the weighing bucket has risen so that the solenoid 141 is deenergized. With this condition the latch bar (Fig. 10) is unlatched from the lug 177 of the lever 178 but is held against it by the spring 179. In this condition each of the clutches C is open so that the feeder and compression screws 94 and 93 are inoperative. On one side of each of the levers 178, a roller 188 is mounted and each of these rollers is engaged by a snail cam 189 on the tubular cam shaft 54. This snail cam 189 is so set with reference to the snail cam 187 (Fig. 14) that as the snail cam 187 opens the cut off gate 155, the snail cam 189 (Fig. 10) depresses the lever 178 until its lug passes under the shoulder on the latch bar 175 and is held there, the spring 179 drawing the latch bar 175 into engagement with this lug 177. This depression of the lever 178 by the snail cam 189 causes the shipper rod 112 and arm 109 to be depressed against the resistance of the spring 116, which depression of the arm 109 (Fig. 20) causes the teeth 106 and 108 to engage and shift the continuously rotating driving sprocket 113 and driving clutch disk 105 into engagement with the driven clutch disk so that this disk 103 is turned, rotating the beveled gears 101 and 100 (Fig. 10), shaft 99, beveled gears 98 and 97, spindle 93 and compression and feeder screws 93 and 94 thereby forcing a stream of powder of uniform cross section through the restricted orifice 96 of the nozzle 95 and into the corresponding weighing bucket 120.

*The bucket discharge mechanism*

Each weighing bucket 120 is filled with its proper weight of powder after which the flow of powder to it is cut off and the weighed batch discharged or dumped from the bucket. With non-free flowing materials, the weight of the powder alone cannot be relied on to open the discharge gates and this must be positively effected. For this purpose the bottom of the bucket is cut along inclined planes against the bottom of which the two gates 190 close. Each of these gates is provided with arms 191 which extend along opposite sides of the bucket and are pivoted at 192 to a bracket 393, two of such brackets being provided, one at the front and the other at the rear side of the bucket, as best shown in Fig. 17. Each gate is counterweighted as at 493 so that its tendency is to close. The two gates 190 of each bucket are cross connected by a pair of links 193, and at their corresponding ends these links 193 are pivoted to a vertical slide 194 which rides vertically between two guides 195. At the pivotal connection 196 between the links 193 and slide 194, a toggle bar 197 is also pivotally connected, the toggle bar being pivotally connected at its upper end to one arm 198 of a bell crank lever 199. This bell crank lever 199 is secured by a fixed pivot 200 to the bucket 120 and this pivot is so located that the link 197 passes beyond dead center. The other arm 201 of the bell crank lever extends rearwardly and carries a roller 202.

On the rear bracket 393 a lip or projection 203 is provided, this lip being adapted to be engaged by a hold down bell crank lever 204. This bell crank lever is pivoted to the frame at 205 and its upper arm is pivotally connected to a cam rod 206, having a slotted head 207. This slotted head 207 carries a roller which engages the periphery of a snail cam 208 on the main cam shaft 54 and this is so set that when the bucket is filled with the proper weight of powder, the snail cam 208 moves the cam rod 206 forwardly which rotates the bell crank lever 204 counterclockwise as viewed in Fig. 17 and causes it to engage and depress the lip 203. This bell crank lever therefore holds the bucket 120 firmly down while its gates 190 are being opened to dump the load of powder.

The initiation of the opening movement of the gates 190 to so dump the load of powder is effected by a lever 210 which is pivoted at its center to a fixed rod 211. The rear end of this rock lever 210 is pivoted to a cam rod 212 which also has a slotted head 213 which embraces the cam shaft 54. This head is provided with a roller 214 which engages the periphery of the snail cam 208a. A spring 215 between the rock lever 210 and a part of the machine frame, yieldingly tends to hold the front end of the rock lever 210 depressed. After the bucket 120 has been pressed down by the bell crank lever 204 as described, the snail cam 208a draws upon the slotted head 213 and elevates the front end of the rock arm 210. This elevation causes it to engage the underside of the roller 202 thereby lifting the arm 201 of the bell crank lever 199 and causing its other arm 198 to be shifted forwardly. This moves the link 197 beyond the center of the pivot 200 and permits it to drop under the weight of powder on the doors 190. This weight of the powder then spreads the cross links 193, draws the slide 194 downwardly in its guides 195 and draws the link 197 also downwardly. The powder is then discharged between the open gates 190 into a hopper 216 and the empty bucket 120 is free to rise. In rising the counterweights 493 on the unweighted doors 190 cause them to close, press upon the links 193 so as to elevate the guided slide 194 and link 197 and the bell crank lever 199 is turned to substantially its full line position shown in Fig. 17. The preponderating weight of the arm 201 of this bell crank lever 199 then causes the link 197 to be shifted beyond dead center so that as the powder is poured into the bucket it will not open the doors 190.

*The bag conveyor*

From the four funnels or hoppers 216 the powder is discharged into paper bags 217 which are moved under these funnels 216, four at a time, the conveyor being so synchronized with the weighing mechanism that four empty bags are below the four funnels when the powder is discharged by the weighing buckets and are then moved on to be removed.

The conveyor includes essentially an endless chain 218 which is carried by two horizontal sprocket wheels 219 and 220, the sprocket 220 being idly mounted on an extension 221 of the main frame and the sprocket wheel 219 being mounted on a vertical power shaft 222. This power shaft is driven intermittently in synchronism with the weighing and discharging mechanisms through means controlled by the main cam shaft 54 in the following manner:

Mounted on the shaft 47 (Fig. 1) which is continuously driven from the motor 44 by belt and pulley 45, 46, is another sprocket which is connected by a chain 223 to a sprocket 225 fast on a worm shaft 224. As best shown in Figure 26, this shaft is journalled in a gear case and carries a worm 226 which meshes with a worm gear 227 fast on a shaft 228. To the lower end of this shaft 228 is secured a horizontal pinion 229. This pinion 229 meshes with a horizontal gear 230 which also forms part of a clutch D. This clutch D, as best shown in Figs. 26, 29 and 30, is preferably constructed as follows:

The gear or driving clutch member 230 is loosely mounted on the vertical shaft 222 which carries the driving sprocket 219 of the bag conveyor and is provided with a depending annular rim 231, this rim being provided with a plurality of semicylindrical recesses 232. Fitting against the underside of this rim 231 is a driven clutch disk 233 which is keyed to the shaft 222. This driven clutch disk is formed to provide a part 234 which projects within the rim 231 of the driving clutch member and is provided with a recess 235, the inner face of the recess 235 being approximately parallel with a tangent of the clutch members and the outer face of the recess 235 being at a divergent angle to the inner face thereof. Mounted loosely on the driven clutch disk 233 is a ratchet rim 236 having ratchet teeth and the ratchet rim also has a pair of pins 237 on one side. Between these teeth is arranged a finger 238 which is fixed to a pin 239, this pin extending through the driven clutch member 233. The end of the pin 239 within the recess 235 is formed to provide a swinging dog 240, the outer face of which is rounded so that as the pin is moved to swing the dog 240 outwardly it is engaged in one of the recesses 232 in the driving clutch member 230 and forms a driving connection between the driving clutch member 230 and the driven clutch member 233.

A spring 241 is secured at one end to one of the pins 237 on the ratchet rim 236 and at its other end is secured to the driven clutch member 233, this spring tending to rotate the ratchet rim in the direction in which the ratchet rim pulls the arm 238 to move the dog 240 into engagement with a recess 232 of the driving clutch member and thereby close the clutch. Normally therefore the clutch is closed and power is transmitted from the driving clutch member 230, dog 240, and rim 231 of the driving clutch member 230.

The release of the clutch is effected from the cam shaft 54. This main cam shaft carries an additional cam 245 which, as best shown in Fig. 27, contacts with a roller 246 on a slotted head 247, this head drawing a bell crank lever 248 against the resistance of a spring 249. The bell crank lever 248 is pivoted at its center to a bracket 250 on the machine frame and its other arm connects with a rod 251. This rod 251 connects with an arm 252 fast to a rock shaft 253, this rock shaft being suitably vertically journalled on the machine frame. The lower end of this rock shaft 253 carries a dog 254 which is movable into engagement with the teeth of the ratchet rim 236.

With the above organization, when the four batches of powder have been dumped into the four bags thereunder (Fig. 1), the constantly rotating main cam shaft 54 rotates the cam 245 (Fig. 27) to draw the slotted head 247 rearwardly against the spring 249. This rotates the bell crank lever 248, reciprocates the rod 251 and rocks the shaft 253 to withdraw the dog 254 from the teeth of the ratchet rim 236. This (Fig. 30) permits the spring 241 to rotate the ratchet rim 231 and swing the arm 238 so as to rotate the internal dog 240 outwardly and into engagement with one of the recesses 232 in the rim 231 of the driven clutch member 230. A driving connection is thereby established between the driving clutch disk 230 which is connected with the motor 44 and the driven clutch member 233 and this driving connection continues until the conveyor chain 218 carried by the sprocket 219 and shaft 222 (Fig. 26) has been advanced exactly four bags, this being determined by the gear ratios in the drive for this chain. When this conveyor chain has been advanced exactly four bags, the cam 245 (Fig. 27) on the main cam shaft 54 releases the slotted head 247 and the spring 249 withdraws the finger 254 into the path of the teeth of the ratchet rim 236, by a reversal in the operation of the parts shown in Fig. 27 just described. When the rotation of the ratchet rim 236 is halted by the dog 254 (Fig. 29), the continued movement of the driven clutch disk 233 causes the arm 238 to be swung counterclockwise as viewed in Figure 29. This retracts the dog 240 from the recess 232 of the rim 231 of the driving clutch member 230 so that the driving connection between the driving clutch gear or member 230 and the driven clutch disk is broken and the movement of the conveyor chain 218 stopped. While so stopped the operation of weighing the four batches of powder and dumping the four batches into the next four bags presented proceeds.

*The bag holding mechanism*

The bags 217 are held by jaws to the endless conveyor chain which moves them four at a time under the discharge hoppers 216 to be filled and then on. The mouths of the bags are applied to these jaws by hand and are automatically removed, the jaws being thereafter closed to receive additional empty bags.

As best shown in Figures 5—9, the conveyor chain 218 is suitably supported by a rail 260 and at spaced intervals pairs of upwardly extended pins 261 and 262 are provided in the chain. On the pin 261 an arm 263 is pivoted and on the other pin 262 an arm 264 is pivoted, these arms projecting perpendicularly outward from the chain. Each of these arms 263 and 264 is formed at its outer end to provide a pair of vertical ears 265, as best shown in Figure 6 which carries a horizontal pivot pin 266. Mounted on each of the pivot pins 266 is a vertically raising arm 267. The outer end of each of these arms 267 is slotted, as indicated at 268 and to each of these outer ends is secured a jaw 269. These jaws are secured by bolts 270 passing through the slots 268 and their mouths oppose one another so that by loosening the bolts 270 the jaws 269 can be adjustably moved toward and from one another. Around the mouth of each of the jaws 269, each jaw is formed to provide a semicircular apron 271 and it is therefore apparent that when the jaws are moved toward one another that the mouth of a bag 217 can be slipped over the aprons 271 and upon thereafter opening the jaws 269, the mouth of the bag will be held by the aprons 271 pressing against opposite sides of the interior of the bag.

The jaws 269 of each bag holder are yieldingly held separated by a spring 275 which at its one end is secured to the inward extension of the arm 263 from its supporting pivot 261 and at its other end is secured to a rearward extension on a link 276, which link is pivoted at 277 to the inward extension of the arm 264 which extends inwardly from its supporting pivot 262. The other end of the lever 276 is pivoted at 284 to the outward extension of the arm 263. To hold the jaws 269 of each bag holder closed, against the resistance of the spring 275, a hand releasable latch bar 278 is provided. This latch bar, as best shown in Figure 9, is pivoted at one end for vertically swinging movement to a swinging post 279, on one of the vertically swinging arms 267, and its free end passes through an opening 280 in a catch 281 on the other vertically swinging arm 267. This latch bar 278 is also provided at its free end with a shoulder 282 and beyond this is formed to provide a handle 283. When the jaws 269 (Fig. 7) together with their supporting arms, are moved toward one another about the pivot pins 261 and 262, the latch bar 278 rides along the catch 281 until its shoulder 282 rides beyond this catch 281. The latch bar 278 thereupon falls and the shoulder 282 on the latch bar 278 prevents the separation of the jaws 269 under the influence of the spring 275 until the latch bar 278 is manually raised, as hereinafter described.

The means for automatically closing and latching the jaws 269 as just described are as follows:

The inward extension of the arm 264 from its supporting pivot 262 (Fig. 7) is longer than the corresponding inward extension of the companion arm 263. At the outer end of the inward extension of the arm 264 a roller 285 is provided, this roller being adapted to engage a stationary cam track 286 at the right hand as viewed in Fig. 1, or feeding end of the machine. When this roller 285 rides up on this track it is moved rearwardly relatively to the movement of the conveyor chain 218 so that the outward extension of this arm 264, which carries one of the jaws 269 is moved forwardly from the dotted line position shown in Fig. 7 to the full line position. At the same time this movement of the inner end of the arm 264 draws the link 276 rearwardly and as the other end of this link is connected to the outward extension of the arm 263, it draws this arm rearwardly to the full line position shown in Fig. 7. In this closing movement of the arms 263 and 264, the latch bar 278 (Fig. 9) rides along the catch 281 until its shoulder 282 rides beyond the catch 281. When the roller 285 (Fig. 7) rides beyond the track 286, the jaws 269 will be held closed by the shoulder 282 in the latch bar 278 (Fig. 9).

As stated, the cam track 286 (Fig. 7) for closing the jaws 269 is at the right hand end of the machine as viewed in Fig. 1 and is located at the bend of the conveyor chain 218 around the sprocket 220. When the bag holders emerge on the front stretch of the conveyor chain, therefore, the bag holder jaws 269 are held closed by their latch bars 278, this condition being best indicated in Figure 3.

The operator stands at the right hand end of the machine with a supply of bags 217. These bags are successively opened up and the mouth of each is slipped over the depending aprons 271 (Fig. 9) on the jaws 269 of the successive bag holders. In slipping the mouth of each bag over the aprons 271 of each successive bag holder, the operator's finger strikes the handle 283 and raises the latch bar 278 until its shoulder 282 clears the catch 281. The jaws 269 (Fig. 7) are then free to open and the spring 275 draws these jaws apart and forces the two depending aprons 271 (Fig. 9) into firm engagement with the opposite insides of the bags. The bags are thereby held by the spring tension of the depending aprons 271 and in this condition are filled.

It is desirable to steady the bags during their movement and for this purpose each of the pins 261 and 262 which form part of the conveyor chain 218 and also carry the arms 263 and 269 of each bag holder, (Fig. 7) is provided with a roller 290 (Fig. 5). These rollers on each of the bag holders engage straight elevated rails 291 along the stretches of the conveyor chain, and as best shown in Figure 5 support the bag holders and bags and steady them so that the bags are fed uniformly and without danger of being loosened from the jaws.

The bags held on the aprons 271 of the conveyor chain are fed forward four at a time by the step-by-step movement of the conveyor chain, as described, and are filled four at a time with the four batches of powder. After the bags have been filled they are conveyed on by the chain and are automatically released from the conveyor chain, this release being preferably constructed as follows:

At the left hand or discharge end of the machine, as viewed in Fig. 3 a curved elevated rail 292 is mounted on the machine frame. This rail extends around the chain as it passes around the driving sprocket 219, as best shown in Figure 3. A pin 293 projects perpendicularly upward and carries a roller 294 on the inner end of each of the arms 267, which are pivoted at 266 (Fig. 6) to raise vertically and which carry the jaws 269 and aprons 271 of each bag holder. As these rollers 294 travel beyond the filling stations, they successively engage the elevated rail 292 which shifts the rollers 294 inwardly and elevates the outer ends of the arms 267. This withdraws the aprons 271 from the mouths of the filled bags so that the bags are entirely freed from the bag holders after they are filled, as best shown in Fig. 6.

In order to steady the bag holder arms while they are being closed, an outer fixed circular rail 286a is provided which engages the rollers 294 of each bag holder as it passes around the sprocket 220 and its jaws are being closed. The rollers 294 riding around the rail 286a insure the positive closing and latching of the jaws 269 by steadying and guiding the arms 267 which support these arms during their closing movement.

*The bag supporting, shaking and discharging mechanism*

The bottom of the bags 217, while being filled and released from the bag holders are supported on the upper stretch of an endless belt 295. As best shown in Figure 4, this belt is carried on pulleys 296, 297 which are mounted in shafts 298 and 299 and can be driven in any suitable manner (not shown). Immediately before the bags pass under the discharge spouts or hoppers 216, the upper stretch of the belt 295 is supported by a stationary track or block 300 and after being filled this belt is supported by another stationary track 301. This eliminates all tendency of the belt 295 to sag.

During the filling operation the bags are shaken to settle the powder in the bags, this being necessary since the powder is non free flowing and will not settle of its own accord. For this purpose a bag shaking mechanism is provided which is preferably constructed as follows:

Secured to the motor driven shaft 47 (Fig. 4) is another sprocket 302 which is connected by a chain 303 with another sprocket 304, this latter sprocket being fast on a shaft 305. The shafts 47 and 305 each carry still another sprocket each of which is connected by a vertical chain 306 with a small sprocket 307 fast on crank shafts 308. These crank shafts, as best shown in Figure 5 are journalled in stationary side plates 309 forming part of the machine frame and at its center each crank shaft is formed to provide a crank 310. Each of these cranks 310 is connected to a pitman or connecting rod consisting of a part 311 engaging the crank, a part 312 engaging a wrist pin 313, and a screw connecting these parts, this screw permitting the pitman to be adjusted as to length. The wrist pins 313 are connected to a shaker frame consisting of two vertical side plates 314 which engage the sides of both pitmen at their opposite ends and are held together by the wrist pins 313. These side plates engage the under side of the upper stretch of the bag supporting belt 295 directly under the filling hoppers 216.

While the bags, held by the bag holders at their mouths and supported at their bottoms on the belt 295 (Fig. 4) are being filled, the crank shafts 308 are rapidly rotated by their driving connections with the motor driven shaft 47, this connection consisting of the sprockets 307 and 304, and chains 306 and 303. This rotation of the crank shafts 308 (Fig. 5) vibrates the two pitmen upwardly and downwardly and consequently vibrates the side plates 314 which form the shaker frame. This vibrates the belt 295 under the bags being filled and consequently settles the powder in the bags. After being filled the bags are released from the bag holders as previously described and the bags follow along with the belt 295 as shown in Figure 4 until they are removed.

In order to adapt the machine to bags of different heights, the idle belt 295 which supports these bags is adjustable vertically and counterweighted so that when short bags are being filled the belt 295 can be raised so as to engage their bottoms. For this purpose, the shafts 298 and 299 (Fig. 4) which idly support the pulleys 296 and 297 carrying the belt 295 are mounted on slides 315 which are supported for vertically sliding movement in slotted brackets 316. These slides can be held in position in any suitable manner as by a tightening bolt 317 (Fig. 1). The slides 315 are each connected to a chain 318 each of which passes over a sprocket 318a, the two sprockets 318a being fast on a shaft 319 (Figs. 1 and 2). The free end of each of the chains carries a counterweight 319a. It is therefore apparent that when the bolts 317 are loosened, the slides 315 can be moved up or down as may be required to move the belt 295 upwardly or downwardly to adapt it to shorter or longer bags 217. This adjustment is facilitated by the two counterweights 319a which through the connected sprockets 318a insure that the ends of the belt 295 raise and lower uniformly.

If desired, a guide rail 335 can be provided at the sides of the line of bags to steady and guide them in their movement, as shown in Fig. 1.

*The stopping and starting mechanism*

Since everything is synchronized with the main cam shaft 54 it is apparent that by stopping this cam shaft everything else stops and conversely when the cam shaft is started after being stopped everything else will be started in proper synchronism. This starting and stopping of the main cam shaft is effected by the clutch A which can be of any suitable type but preferably is of the same general type as the clutch D, previously described, and as best shown in Figs. 13, 31 and 33, is preferably constructed as follows:

The cam shaft 54, as previously described is hollow and is loosely mounted on its driving shaft 55. This driving shaft is connected with the motor 44 through the variable speed gearing B (Fig. 13), sprocket 58, chain 57 (Fig. 10), sprocket 56, shaft 51, sprocket 50, chain 49, (Fig. 1), sprocket shaft 47, pulley 46, and belt 45.

The clutch A between this shaft 55 and the hollow cam shaft which it supports, comprises a driving collar 320 which is fixed to the drive shaft 55 and has a plurality of half round spaced recesses 321 on the inner side of its rim. In this collar is arranged a hub 322 which is fast to the cam shaft 54 and loosely mounted on the periphery of the collar 321 is a ratchet rim 323. Arranged in a half round recess in the periphery of the hub 322 is a half round pin or key 324 which is turned into and out of interlocking engagement with one of the recesses 321 in the collar 320 by a swinging piece 325. This piece 325 extends out of the hub collar 322 and is held between two fingers 326 on the ratchet rim 323. The ratchet rim 323 is connected to the hub 322 by a spring 327 which urges the ratchet rim in the direction in which its fingers 326 move the piece 325 to rotate the half round locking pin or key 324 into interlocking engagement with the driving collar 321. It is therefore apparent that when the ratchet rim is free all parts will rotate together and the clutch will be closed with a driving connection between the shaft 55 and the hollow cam shaft 54.

To stop the rotation of the ratchet rim, a dog 327a is mounted on a rock shaft 328, this rock shaft being suitably journaled on the main frame and, as previously described, also loosely carries the latch bars 175 which form a part of the control for the feeder screw start and stop clutches C. On one end of this rock shaft 328, a rock arm 329 is mounted (Fig. 1) and this is connected by a shipper rod 330 with a bell crank lever 331. This bell crank lever is suitably mounted on a bracket and its other arm carries a rod 332 which at its other end is mounted on an idle arm 333.

When the operator wishes to stop the operation of the machine, he pushes the rod 332 inwardly. This raises the arm 329 and rocks the dog 327a (Fig. 10) into the path of the teeth of the ratchet rim. Upon stopping the ratchet rim the metal piece is moved counterclockwise, as viewed in Fig. 31, the half round locking pin 324 is moved into neutral or wholly within its recess in the groove of the driven hub 322 and the driving collar 320 rotates idly. As the cam shaft 54 is thereby rendered idle, its function ceases and the machine comes to rest as soon as all the batches have been filled into the weighing buckets. When the machine is again started, its functions are again started in synchronism.

Operation

In the following resumé of the operation of this machine it has been assumed that the weighing buckets are being filled with four batches of powder. In this condition of the machine the conveyor chain 218 is stationary, the clutch D, (Fig. 26) being open, and the motor is driving the main shaft 43 and the cam shaft 54. The main shaft is driven from the motor 44 (Fig. 1), belt 45, pulley 46, shaft 47, chain 49 (Fig. 10), sprocket 50, shaft 51, bevel gear 52, and bevel gear 53, fast on the main drive shaft, and the cam shaft 54 is driven from said shaft 51, sprocket 56, chain 57 (Fig. 24), sprocket 58, variable speed gearing B, shaft 60, worm 74, worm gear 75, shaft 55 and clutch A, which drives the hollow cam shaft 54 (Fig. 31) from its said interior drive shaft 55.

In this assumed condition of the parts each of the four clutches C is closed and consequently (Fig. 13) power from the main drive shaft will be transmitted through sprockets 115, chains 114, sprockets 113, friction clutches C, bevel gears 101 and 100 (Fig. 10), shafts 99, bevel gears 98 and 97, to the spindles 92. This rotates the screws 93 and 94 in the cylindrical hoppers 91. The larger screws 93 pack the powder down into the field of the feeder screws 94 and the excess powder flows upwardly around the sides of the larger compression screws 93 and is resisted by the head of powder in the receiving reservoirs 80 so that the powder fed to the feeder screws 94 is of uniform compactness and wholly free from air pockets or the like. The screws 94 force this compacted powder through the restricted orifices 96 in the nozzles 95 and down into the weighing buckets.

In this condition of the parts the cutoff gates 155 are each latched in their open position, the catch pin of each of these gates being in engagement with the corresponding notch 159 of its counterweighted latching bar 160.

While this operation is continuing the operator is applying empty bags to the bag holders. He does this by opening up the mouth of each bag 217, placing the mouth of each bag under and around the aprons 271 of each bag holder (Fig. 6) and at the same time elevating the handle 283 of the latch bar 278 of each bag holder (Fig. 9) as he applies the bag thereto. This lifting of the latch bar 278 frees the catch 281 from the shoulder 282 on the latch bar 278 and permits the spring 275 (Fig. 7) to spread the jaws 269 and consequently catch the mouth of the bag 217 between the two aprons 271 to be held thereby.

The filling operation continues (Fig. 10) until the weighing buckets 120 are filled with predetermined weights of powder. When this occurs the depression of each of the weighing buckets causes the L-shaped arm 163 (Fig. 16) on one of its brackets 121 to depress the counterweighted latch bar 160 far enough to release the catch pin 158 from the notch 159. This catch pin 158 is fixed to the cut off gate 155 and consequently when this occurs the cut off gate 155 (Fig. 14) drops or swings into a horizontal position about its pivot and cuts off the stream of powder from the restricted orifice 96 while the stream is still in the air.

At the same time the compression and feeder screws 93 and 94 are stopped to cut off the further feeding of powder through the following mechanism. The depression of the buckets 120 (Fig. 16) under the predetermined weight of powder depresses the rear ends of the scale beams 124 upon which these buckets are hung and (Fig. 10) elevates the counterweighted front ends of these scale beams 124, these scale beams being supported on knife blade pivots. The elevation of each front end of the scale beams 124 causes it to engage the upper jaw 131 (Fig. 12) of the swinging bar 130 and swing it to the position shown in Fig. 12. In this position the mercury 137 in the tube 136 flows forwardly and establishes a circuit between the contacts 138. This (Fig. 10) establishes a circuit through contacts 138, wires 139, battery 140, and solenoid 141.

The energization of the solenoid 141 causes the depression of its movable core 170 and swings the bell crank lever 172 to shift the link 174 forwardly. This swings the loosely hung large bar 175 forwardly, and releases the lug 177 on the lever 178. This permits the spring 116 to elevate the lever 178, shipper rod 112, and rod 109. This movement of the lever 109 (Fig. 22) moves its conical pins 108 out of engagement with the corresponding conical pins 106 on the fixed bracket 107 and this (Fig. 20) permits the spring loaded plunger 111 to move the driving clutch member 105 together with its sprocket 113, out of engagement with the driven clutch member 103. The clutches C are therefore opened and power is not transmitted to the bevel gears 101, 100 (Fig. 10), shaft 99, bevel gears 98 and 97 and spindles 92 so that the rotation of the compression screws 93 and the feeder screws 94 is stopped and no more powder is fed through the restricted orifices 96 in the nozzles 95. The turning of the cam shaft 54 causes its four cams (Fig. 17) to shift the cam rods 206 forwardly and this rotates the upper arms of the bell crank levers 204 to force the other arms of these bell crank levers down upon the corresponding lips or extensions 203 on the weighing buckets 120. The weighing buckets are thus securely held down and the continued rotation of the cams 208a causes the slotted head 213 and cam rods 212 to be shifted downwardly and rearwardly. This rotates the levers 210 and causes their front ends to engage and lift the rollers 202 on the bell crank levers 199. The lifting of the bell crank lever 199 of each weighing or scale bucket causes its other arm 198 to be shifted forward of dead center. The weighted doors 190 are then free to fall, this opening movement of the doors 190 spreading the links 193, shifting the guided slide 194 downwardly and depressing the link 197. The weighing buckets are now relieved of their powder and are in condition to be reset or refilling. In the resetting of the weighing mechanism to the original condition assumed at the start of the description of this operation the counterweights 493 (Fig. 17) first return the unweighted doors 190 to their closed position. This movement causes the links 193 to be brought together, the guided slide 194 to be elevated and the link 197 to raise the arm 198 of the bell crank lever 199 to a substantially vertical position. When this substantially vertical position is obtained the preponderating weight of the other arm 201 of this bell crank lever 199 causes the bell crank lever 199 to throw the link 197 rearwardly beyond dead center so that the doors 190 are latched in their closed position until released as just described. During this operation the weighing buckets 120, of course, rise and at the same time the levers 210 and 204 are returned to their normal inoperative position by the continued rotation of their controlling cams 208 and 208a on the continuously rotating cam shaft 54.

As soon as the buckets are emptied and start to rise (Fig. 10) the front ends of the scale beams 124 lower and their extensions 133 strike the lower jaws 132 (Fig. 11) of the swinging bars 130 and move these bars to the vertical position shown in Fig. 11. In this position the glass tube 136 is tilted so that the mercury 137 therein is out of contact with the contacts 138 and the circuit (Fig. 10) through the wires 139, battery 140 and solenoid 141 is broken so that the solenoid 141 is deenergized. As soon as the weighing buckets 120 start to rise the continuously rotating cam shaft causes its cams 187 (Fig. 14) to shift the slotted head 185 downwardly and elevate the front end of the lever 181. The elevation of the front end of the lever 181 causes it to engage the pin 180 (Fig. 15) on the cut off gate 155 and lift this gate to the position shown in Fig. 14. In so lifting the gate 155 (Fig. 16) its catch pin 158 rides beyond the notch 159 in the counterweighted latch bar 160 so that the cut off gate is latched against returning to its operative position until the several latch bars 160 are again depressed, as just described. This permits the powder from the restricted orifices 96 to fall into the weighing buckets 120.

At the same time the four cams 189 on the continuously rotating cam shaft 54 cause a depression of the arms 178 (Fig. 10) and this causes a depression of the lugs 177 and causes these lugs to be caught under the shoulders of the latch bars 175, the springs 179 drawing these latch bars 175 into engagement with these lugs 177. The depression of the levers 178 by the cams 189 also causes the shipper rods 112 and arms 109 to be depressed. This (Fig. 22) causes the conical pins 108 on the arms 109 to be forced into engagement with the corresponding stationary pins 106 and this (Fig. 20) causes the driving member 105 of each of the clutches C to be forced into driving engagement with the driven disk 103. When this occurs motion is transmitted from the main shaft 43, sprocket 115, chain 114, sprocket 113, driving clutch disk 105, driven clutch disk 103, beveled gears 101 and 100 (Fig. 10), shaft 99, beveled gears 98 and 97 and spindles 92. This rotates the compression screws 93 and feeder screws 94 so that powder is again forced through the restricted orifices 96 in the nozzles 95 and into the weighing buckets 120.

As soon as the doors 190 (Fig. 18) open, the weighed batch of powder is dropped into the conical hoppers 216 (Fig. 4) and these batches of powder empty directly into the bags 217 arranged thereunder. While the powder is thus falling into the bags the bags are vibrated so as to settle the powder. This is effected by the rotation of the shaft 47, through the chain 303, turning the chains 306 and sprockets 307. The turning of these two sprockets 307 (Fig. 5) rotates the crank shafts 308 and the cranks 310 on these crank shafts vibrate the pitmen thereon vertically so as to shake or vibrate the side plates 314 up and down. This shakes the belt 295 which supports the bags 217 during their filling operation and consequently shakes the bags 217 while they are being filled and settling the powder down into the bags.

As soon as the four bags 217 are filled the continuously rotating cam shaft 54 (Fig. 27) causes its cam 245 to move the slotted head 247 rearwardly against the resistance of the spring 249. This shifts the rod 251 outwardly and causes the rock shaft 253 to be rotated so as to throw the dog 254 out of engagement with the rim 236 of the clutch D. When this dog 254 is thus thrown out of the path of the ratchet rim 236 as shown in Fig. 30, the spring 241 shifts the ratchet rim 236 counterclockwise, as viewed in Fig. 30. This moves the arm 238, pin 239 and dog 240 counterclockwise or into engagement with the recesses 232 in the rim 231 of the driving clutch member or gear 230. With this driving connection motion is transmitted (Fig. 1) from the motor 44, belt 45, pulley 46, shaft 47, chain 223, sprocket 225 (Fig. 26), shaft 224, worm 226, worm gear 227, shaft 228, gear 229, driving clutch member or gear 230 and its rim 231 (Fig. 30), dog 40, driven clutch member 234, shaft 222 (Fig. 26) and sprocket 219, which carries the conveyor chain 218. The gear ratio in the train of gears just described is such that the conveyor chain 218 (Fig. 3), is advanced exactly four bags at which time the cam shaft 54 (Fig. 27) releases the slotted head 247 and permits the spring 249 to move the load 251 and rock shaft 253 and move the dog 254 into engagement with the ratchet rim 236 (Fig. 29). This stops the rotation of the ratchet rim 231, the arm 238 and its pin 239 and dog 240 are shifted counterclockwise (since the driven clutch member 234 will tend to continue its movement and the arm 238 is held between the pins 237) and consequently the dog 240 is moved out of engagement with the semi-circular recesses 232 in the rim 231 of the driving clutch member 230. This therefore breaks the driving connection between the driving clutch member 230 and the driven clutch member 234 so that motion is no longer transmitted to the shaft 222 and its sprocket 219 which carries the conveyor chain 218. At this time four empty bags on the bag holders carried by the conveyor chain 218 have been moved under the four hoppers 216 so that they are again ready to be filled.

While the conveyor chain was being advanced four bags as just described the rollers 294 (Fig. 6) on the pins 293 which project upwardly from each of the arms 267 of each bag holder, engage the rail 292 and this rail moves the rollers 294 inwardly so that the arms 267 of each bag holder are swung upwardly about their pivots 266. This pulls the aprons 271 of each bag holder free of the mouth of the bag and the bag is free to continue on the belt 295 (Fig. 4), this belt being urged forwardly by the filled bags 217 which rest thereon and which are still held by the bag holders so that the motion of the conveyor chain 218 is transmitted to the belt 295. The bags are, of course, removed from the discharge end of the belt 295 and the bag holders continue with the conveyor chain 218 around the sprocket 219. When the rollers 294 (Fig. 6) pass beyond the end of the rail 292 the arms 267 of each bag holder drop into their normal horizontal position.

When the bag holders carried by the conveyor chain 218 arrive at the feeding end of the machine, the rollers 285 (Fig. 7) encounter the cam rail 286 which holds back the rearmost arm 264 of each bag holder. Since this rearmost arm 264 is pivoted at 262, its outer end which carries one of the bag holding jaws 269 is moved forwardly relative to the movement of the conveyor chain 218 and at the same time since the inward extension of the arm 264 is connected with the outward extension of the arm 263 by the link 276 the outer end of the arm 263 which carries the companion bag holding jaws 269 is moved in the opposite direction. The jaws 269 of each bag holder are thereby moved together as the cam track 268 is encountered by the roller 285. As these jaws are moved together the vertically rising arms 267 which carry these jaws are also moved together and this causes the latch bar 278 (Fig. 9) to ride along the catch 281 until its shoulder engages the outside of this catch. The jaws 269 of each bag holder are thereafter held together with the latch bar 279 until the operator, fitting the mouth of the bag around the aprons 271 of each successive bag holder strikes and raises the latch bar 278 to free the catch 281 from the shoulder 282 and permit the spring (Fig. 7) to spread the jaws 269 and press the aprons (Fig. 5) against the inside of the mouth of the bag. This automatic closing and manual opening of the bag holders is best illustrated in Fig. 3. It is apparent that except for the actual cutting off of the flow of powder into the weighing buckets and the stopping of the screws which provide this flow, all operations are controlled by the cam shaft 54. This cam shaft should be given a single rotation in more time than it actually takes to fill up a weighing bucket. Thus the weighing operation is definitely performed and controlled directly by the weight of powder deposited into the buckets and the other operations must be timed to this, consequently by turning the cam shaft somewhat slower than is actually necessary, the proper operation of the machine is insured.

In addition some materials are more free flowing than others and conditions of humidity and other factors will enter into the operation of the machine. It is necessary in all events that the rotation of the main cam shaft 54 be synchronized with the weighing operation so that when extremely nonfree flowing materials or heavier portions of powder are to be weighed that the cam shaft be slowed up in its movement relative to the weighing operation of the machine. For this purpose the variable speed gear B is positioned in the cam shaft drive. This variable speed gear is operated (Fig. 23) by turning the hand lever 72 which turns the pinion 70 and rotates the gears 68 and 69 in opposite directions. These gears 68 and 69 rotate the yokes 66 and 67 and swing the pulleys 64 and 65 in opposite directions. When these pulleys 64 and 65 are swung to the dotted line position shown in Fig. 25 the cam shaft 54 will be driven at reduced speed since motion from the power chain 57 (Fig. 24) is transmitted through the sprocket 58, outer or marginal part of the driving disk 59, pulleys 64 and 65, inner or central part of the driven disk 61, shaft 60, worm 74, worm gear 75 and shaft 55 which through the clutch A drives the cam shaft.

When the pulleys 64 and 65 are swung to an opposite oblique position from that shown by dotted lines in Fig. 25 it is apparent that the motion is transmitted from the inner or central part of the driving disk 59 to the outer or marginal part of the driven disk 61 and therefore the driven disk 61 will be driven at higher speed than the driving disk 59. It is also apparent that any intermediate speed can be obtained according to the positions of the pulleys 64 and 65. By adjusting the pulleys 64 and 65 in this manner it will be seen that the cam shaft 54 can be driven at different speeds in synchronism with the main drive shaft to suit different materials being filled and weighed and also to suit different weights of materials being packed in containers.

When the operator wishes to stop the operation of the machine he pushes the rod 332 (Fig. 1) inwardly thereby raising the rod 330 and rock arm 329 and rocking the rock shaft 328 to move the dog 327a (Fig. 31) into the path of the teeth of the ratchet rim 323. This causes the piece 325 to be moved clockwise as viewed in Fig. 31 and breaks the driving connection of its half round pin 324 with one of the recesses 321 of the driving collar 320. Since then the driving connection between this driving collar 320 which is fast to the shaft 55 and the hub 322 which is fast to the cam shaft, is now broken, the cam shaft will stop. This will stop the entire functioning of the machine except that the compression and feeder screws 93 and 94 will continue to operate until they have discharged the weighed portions of powder into the weighing buckets 120 upon which they will be stopped and the cut off gates 155 released, this function being in no way dependent upon the cam shaft.

When the dog 327a (Fig. 31) is withdrawn from the teeth of the ratchet rim 323 by pulling outwardly upon the rod 332 (Fig. 1) the spring 327 will pull the ratchet rim so as to rotate the piece 325 counterclockwise and rotate its half round pin 324 into driving engagement with one of the recesses 321 of the driving clutch member or collar 320. When this occurs the cam shaft 54 is again continuously rotated and it will start functioning to discharge the weighed portions of powder in the weighing buckets and to reset and operate the other mechanisms as previously described.

As a whole this invention provides a full automatic weighing and filling machine in which all functions except the actual stopping and cutting off of the stream of powder into the weighing buckets is effected directly and positively from a synchronized continuously rotating cam shaft. By this means accurate weights are obtained and at the same time the bags can be filled at greater speed and the machine is entirely positive and reliable in its operation. A machine having these characteristics can also be made comparatively simple considering the function which it performs, it is simple and direct in its action, can be readily repaired and will not get out of order under severe and constant use. Accurate weights are also obtained by the use of the coacting compression and feeder screws to provide a stream of powder of absolutely uniform cross section to the weighing buckets, thereby insuring that entirely accurate weights are obtained. The bags or other containers are also accurately and quickly filled, the contents are shaken so as to settle the powder in the bags or containers, and bags are easily fed to the machine and are automatically discharged so that the machine can be operated by one person.

While I have shown the preferred embodiment of my invention it will be appreciated that the principles of my invention can be varied as to detail within wide ranges and embodied in machines varying substantially from the details of construction described. The invention is therefore to be construed as limited only by the elements resided in the following claims, or their equivalents and is not limited to any particular construction. The reference numerals employed in the following claims are inserted only to assist reading of these claims upon the drawings and are in no way intended to limit the scope thereof or have any other effect upon their interpretation.

I claim:

1. In an automatic weighing machine, a scale (124), a receptacle (120) on said scale, means (95) for discharging a stream of the material to be weighed into said receptacle, a cut off gate (155) pivotally mounted to cut off said stream of material, a catch pin (158) on said cut off gate, a counterweighted bar (160) pivotally mounted adjacent said cut off gate and having a notch adapted to catch said catch pin and hold said cut off gate in an inoperative position, an abutment (163) operatively connected with said scale and adapted to engage said counterweighted bar and effect a release of said catch pin when a definite weight of powder has flowed into said receptacle whereby said cut off gate is moved to cut off said stream, and means (54) for resetting said cut off gate in its latched inoperative position.

2. In an automatic weighing machine, a scale (124), a receptacle (120) on said scale, means (95) for discharging a stream of the material to be weighed into said receptacle, a cut off gate (155) for cutting off said stream of material, latch means (160) for holding said cut off gate in an inoperative position, means (163) operatively connected with said scale for releasing said latch means whereby said cut off gate is moved to cut off said stream, and means for resetting said cut off gate into its inoperative position comprising a continuously rotating cam (187) synchronized with the discharge of uniform amounts of material into said receptacle, a lever (181) actuated by said cam, and a projection (180) on said cut off gate, said cam moving said arm and projection to move and latch said cut off gate in its inoperative position subsequent to the discharge of a portion of material in said receptacle.

3. In an automatic weighing machine, a scale (124), a receptacle (120) on said scale, means (94) for positively discharging a stream of the material to be weighed into said receptacle, means (155) for cutting off said stream, means (160) responsive to the depression of said receptacle for actuating said cutting off means to cut off said stream, means (141) responsive to the said depression of said receptacle for rendering inoperative said discharging means and continuously operating cam means (54) synchronized with the discharge of uniform amounts of material into said receptacle for subsequently rendering said cutting off means inoperative and said discharging means operative.

4. In an automatic weighing machine, a scale (124), a receptacle (120) on said scale, means (94) for positively discharging a stream of the material to be weighed into said receptacle, means for rendering said discharging means inoperative when a definite amount of said material has been forced into said receptacle, comprising a clutch (C) connecting the said discharging means with a power source (44) and means (141) responsive to the depression of said receptacle for opening said clutch and means for subsequently rendering said discharging means operative comprising constantly rotating cam means (54) synchronized with the discharge of the definite amount of material into said receptacle for subsequently closing said clutch.

5. In an automatic weighing machine, a scale (124), a receptacle (120) on said scale, means (94) for positively discharging a stream of the material to be weighed into said receptacle, means for rendering said discharging means inoperative when a definite amount of said material has been forced into said receptacle comprising a clutch (C) connecting said discharging means with a power source (44), a latch (175) operatively connected with said clutch and holding said clutch closed and means (141) responsive to the depression of said receptacle for releasing said latching means and means for subsequently rendering said discharging means operative comprising constantly rotating means (54) synchronized with the discharge of uniform amounts of material into said receptacle for resetting said latch and thereby closing said clutch.

6. In an automatic weighing machine, a scale (124), a receptacle (120) on said scale, means (94) for positively discharging a stream of the material to be weighed into said receptacle, means for rendering said discharging means inoperative when a definite amount of said material has been forced into said receptacle, comprising a clutch (C) connecting said discharging means with a power source (44), a pivoted bar (178) connected with said clutch arm, means (116) yieldingly holding said clutch open, a pivoted latch bar (175) arranged adjacent said first pivoted bar and having latching engagement therewith to latch said clutch in its closed position, means (141) responsive to the depression of the receptacle for moving said latch bar to release said first named pivoted bar, and means for subsequently rendering said discharging means operative comprising a constantly rotating cam (189) synchronized with the discharge of uniform amounts of material into said receptacle for moving said pivoted bar (178) and resetting it in latching engagement with said latch bar (175) thereby closing said clutch (C).

7. In an automatic weighing machine, a plurality of scales (124), a receptacle (120) on each scale, means (94) associated with each of said receptacles for positively discharging a stream of the material to be weighed into each receptacle, means (155) associated with each of said receptacles for cutting off said streams, means (160) responsive to the depression of each of said receptacles for actuating the corresponding cutting off means to cut off the corresponding stream, means (141) responsive to the said depression of each receptacle for rendering its said discharging means inoperative and continuously operating means (54) synchronized with the discharges of uniform amounts of material into said receptacles for simultaneously rendering all of said cutting off means inoperative and rendering said discharging means operative.

8. In an automatic weighing machine, a plurality of scales (124), a receptacle (120) on each scale, means (94) associated with each of said receptacles for positively discharging a stream of the material to be weighed into each receptacle, means (155) associated with each of said receptacles for cutting off said streams, means (160) responsive to the depression of each of said receptacles for actuating the corresponding cutting off means to cut off the corresponding stream, means (141) responsive to the said depression of each receptacle for rendering its said discharging means inoperative and continuously operating cam means (54) synchronized with the discharges of uniform amounts of material into said receptacles for simultaneously rendering all of said cutting off means inoperative and rendering said discharging means operative.

9. In an automatic weighing machine, a scale (124), a receptacle (120) on said scale, a bowl (91) above said receptacle and having a discharge nozzle (95) discharging into said receptacle, a feeder screw (94) arranged in the lower part of said bowl, a compression screw (93) arranged above said feeder screw and adapted to move an excess of material into the field of said feeder screw, means (141) responsive to the depression of said receptacle under uniform loads of material for rendering said screws inoperative and means (54) synchronized with said filling of said receptacle with said uniform amounts of material for rendering said screws inoperative.

10. In an automatic weighing machine, a scale (124), a receptacle (120) on said scale, a bowl (91) above said receptacle and having a discharge nozzle (95) discharging into said receptacle, a spindle (92) arranged in said receptacle, a feeder screw (94) carried by said spindle and arranged adjacent said nozzle (95) a compression screw (93) of larger diameter than said feeder screw carried by said spindle remote from said nozzle and adapted to move an excess of material into the field of said feeder screw, means (141) responsive to the depression of said receptacle under a load of material for rendering said spindle inoperative and means (54) synchronized with said filling of said receptacle with uniform amounts of material for turning said spindle to cause said screws to effect a discharge of material through said nozzle.

11. In an automatic weighing machine, a scale (124), a receptacle (120) on said scale, a round bowl (91) above said receptacle and having a discharge nozzle (95) with a restricted orifice (96) a spindle (92) arranged in said receptacle, a feeder screw (94) carried by said spindle and arranged in said nozzle, a compression screw (93) of larger diameter than said feeder screw carried by said spindle above said feeder screw and having its edges spaced a small distance from the sides of said bowl, said compression screw being adapted to move an excess of material into the field of said feeder screw, means (141) responsive to the depression of said receptacle under a definite load of material for rendering said spindle inoperative and means (54) synchronized with said filling of said receptacle with uniform amounts of material for turning said spindle to cause said screws to effect a discharge of material through said nozzle.

12. In an automatic weighing machine, a scale (124), a receptacle (120) on said scale, means (94) for positively discharging a stream of the material to be weighed into said receptacle, means for rendering said discharging means inoperative when a definite amount of said material has been forced into said receptacle, comprising a clutch (C) connecting the said discharging means with a power source (44) and electro-magnetic means (141) responsive to the predetermined depression of said receptacle for opening said clutch and means for subsequently rendering said discharging means operative comprising constantly rotating means (54) synchronized with the discharge of uniform amounts of material into said receptacle for subsequently closing said clutch.

13. In an automatic weighing machine, a scale (124), a receptacle (120) on said scale, means (94) for positively discharging a stream of the material to be weighed into said receptacle, means for rendering said discharging means inoperative when a definite amount of said material has been forced into said receptacle including a pivoted bar (130) adapted to be swung in opposite directions by the extremes of movement of said scale, a mercury filled tube (136) carried by said bar and having a pair of contacts (138) adapted to be bridged by said mercury when said bar is tilted into one extremity of its movement, a solenoid (141) and a source of electrical energy (140) in circuit with said contacts, a movable core (170) in said solenoid, and means responsive to the movement of said solenoid for rendering said discharging means inoperative when said tube is tilted a predetermined extent by the predetermined load in said receptacle and means for subsequently rendering said discharging means operative.

14. In an automatic weighing machine, a scale (124), a weighing bucket (120) on said scale, means (95) for discharging a stream of the material to be weighed into said bucket, means (155) responsive to the depression of said bucket under a definite load for cutting off said stream, a discharge gate (190) at the bottom of said bucket, constantly operating means (54) synchronized with the discharge of uniform amounts of material into said bucket for engaging a stationary part on said bucket and holding down the filled bucket after it has been filled with the definite weight of powder and thereafter initiating the opening movement of said gate to discharge the material from said bucket.

15. In an automatic weighing machine, a scale (124), a weighing bucket (120) carried on said scale, means (95) for discharging a stream of the material to be weighed into said bucket, means (155) responsive to the depression of said bucket for cutting off said stream, a gate (190) at the bottom of said bucket, a cam shaft (54) synchronized in its rotation with the speed of filling of said bucket, a hold down arm (205) actuated by said cam shaft to engage and hold down said bucket subsequent to the filling of said bucket with definite amounts of material, a second arm (210) actuated by said cam shaft subsequent to said hold down cam and means for initiating the opening movement of said gate through motion derived from said second arm.

16. In an automatic weighing machine, a scale (124), a weighing bucket (120) carried on said scale, means (95) for discharging a stream of the material to be weighed into said bucket, means (155) responsive to the depression of said bucket for cutting off said stream, a gate (190) at the bottom of said bucket, constantly rotating cam means (54) synchronized with the discharge of uniform amounts of material into said bucket, means (210) operated through motion derived from said cam means for opening said gate subsequent to the cutting off of said stream into the weighing bucket, means (493) for subsequently closing said gate and means (181) operated through motion derived from said cam means for subsequently rendering said cutting off means inoperative.

17. In an automatic weighing machine, a scale (124), a weighing bucket (120) carried by said scale, means (155) responsive to the depression of said bucket for cutting off said stream, a pair of counterweighted gates (190) pivoted to the bottom of the bucket to swing upwardly and close the same, a pair of links (193) connecting said gates, an arm (199) pivoted at its lower end to the upper end of said bucket, a bar (197) pivotally connecting the upper end of said arm and the pivotal connection (196) between said links, a lateral extension (201) on said arm, the counterweights (493) on said doors elevating said bar (197) and arm (199) and said extension (201) throwing said bar (197) beyond dead center, and means for initiating the opening movement of said gates comprising an arm (210) adapted to engage said extension (201) and throw said bar (197) beyond dead center and permit the doors (190) to drop and discharge their weight of material, and means (54) for actuating said arm (210) in synchronism with the filling of said bucket and subsequent to said cutting off of the flow of material therein.

18. In an automatic weighing machine, a plurality of weighing scales (124), a weighing bucket (120) carried by each of said scales, means (95) associated with each bucket for discharging a stream of the material to be weighed into said bucket, means (155) associated with each bucket and each responsive to the depression of its bucket to cut off the stream flowing therein, a gate (190) at the bottom of each bucket and continuously operating means (54) synchronized with the discharge of uniform amounts of material into all of the buckets for simultaneously and positively initiating the opening movement of the gates of all of the buckets subsequent to the cutting off of said streams of material into said buckets.

19. In an automatic weighing machine, a plurality of weighing scales (124), a weighing bucket (120) carried by each of said scales, means (195) associated with each bucket for discharging a stream of the material to be weighed into said bucket, means (155) associated with each bucket and each responsive to the depression of its bucket to cut off the stream flowing therein, a gate (190) at the bottom of each bucket, a continuously rotating cam shaft (54) synchronized with the discharge of uniform amounts of material into all of the buckets and means (210) actuated by said cam shaft subsequent to said cutting off of the flow of material into said buckets for simultaneously initiating the opening movement of the gates of all of the buckets.

20. In an automatic weighing and filling machine, a scale (124), a receptacle (120) on said scale, means (95) for discharging a stream of material into said receptacle, means (155) for cutting off the flow of material into said receptacle, means (190) for discharging the weighed batch of material from said receptacle, a conveyer (218) arranged to pass under said receptacle and adapted to carry a series of containers (217) and means for advancing said conveyer step-by-step to position an empty container below said receptacle at the time of its discharge including a clutch (D) connecting said conveyer with a source of power (44), a continuously rotating member (54) driven by said source of power synchronized with the speed of filling of said container and means (354) for opening and closing said clutch through motion derived from said synchronized member.

21. In an automatic weighing and filling machine, a scale (124), a receptacle (120) on said scale, means (95) for discharging a stream of material into said receptacle, means (155) for cutting off the flow of material into said receptacle, means (190) for discharging the weighed batch of material from said receptacle, a conveyer (218) arranged to pass under said receptacle and adapted to carry a series of containers (217) and means for advancing said conveyer step-by-step to position an empty container below said receptacle at the time of its discharge including a clutch (D) connecting said conveyer with a source of power (44), a continuously rotating cam member (54) driven by said source of power synchronized with the speed of filling of said container and means (354) for opening and closing said clutch through motion derived from said synchronized member.

22. In an automatic weighing and filling machine, a scale (124), a receptacle (120) on said scale, means (95) for discharging a stream of material into said receptacle, means (155) responsive to the weight of the material in said receptacle for cutting off the flow of material into said receptacle, means (190) for discharging the weighed batch of material from said receptacle, a cam shaft (54), a motor (44) driving said cam shaft in synchronism with the filling of said receptacle, means (210) actuated through motion derived from said cam shaft for operating said discharge means, a horizontal endless conveyer (218) arranged to pass under said receptacle and adapted to carry a series of containers (217) and means for advancing said conveyer step-by-step to position said receptacles successively under said receptacle discharging means at the time of its discharge including a clutch (D) connecting said conveyer with said source of power, and means (354) for opening and closing said clutch through motion derived from said cam shaft whereby said containers are each held stationary while being filled.

23. In an automatic weighing and filling machine, a plurality of scales (124), a receptacle (120) on each scale, means (95) for discharging separate streams of the material to be weighed into said receptacles, means (155) responsive to the depression of each receptacle under a definite weight of material for cutting off the flow of each stream to its receptacle, means (190) associated with each receptacle for discharging the weighed batches of material from said receptacle, a rotating member (54), a motor (44) driving said rotating member in synchronism with the filling of said receptacles, means (180) actuated by said rotating member for actuating all of said discharge means simultaneously and subsequent to said cutting off of the flow of material to said receptacles, a conveyer (218) arranged to pass under all of said receptacles and adapted to carry a series of containers (217) and means for advancing said conveyer step-by-step to position a series of empty containers below said receptacles at the time of their discharge, a clutch (D) connecting said conveyer with said source of power and means (354) for opening and closing said clutch through motion derived from said rotating member whereby said containers are each held stationary while being filled.

24. In a weighing and filling machine, a horizontal step-by-step conveyer (218) adapted to carry a series of containers, a motor (44) for driving said conveyer, means for discharging weighed portions of the material to be weighed into said containers while said conveyer is at rest, a belt (295) supported on idle pulleys (296 and 297) and supporting the bottoms of said containers while they are being filled, a vibrating frame (314) supporting said belt below said containers being filled and means (308) for continuously vibrating said frame, said last named means being actuated by said motor.

25. In an automatic weighing machine, a scale (124), a receptacle (120) on said scale, means (95) for discharging a stream of the material to be weighed into said receptacle, means (155) responsive to the depression of said receptacle under a definite load for cutting off said stream, a motor (44), a continuously rotating member (54) driven by said motor, means (181) actuated by said continuously rotating member for returning said cutting off mechanism to its inoperative position, and means for synchronizing said rotating member with the speed of filling of said receptacle comprising a variable speed gearing (B) interposed between said rotating member and said motor.

26. In an automatic weighing machine, a scale (124), a receptacle (120) on said scale, means (94) for positively feeding a stream of material to be weighed into said receptacle, a motor (44) for driving said feeding means, a clutch (C) interposed between said motor and feeding means, means (141) responsive to the depression of said receptacle under a definite weight of material for opening said clutch, a constantly rotating member (54) driven by said motor, means for closing said clutch through motion derived from said rotating member and means for synchronizing the rotation of said rotating member with the speed of filling of said container comprising a variable speed gearing (B) interposed between said motor and rotating member.

27. In an automatic weighing machine, a scale (124), a receptacle (120) on said scale, means (94) for positively feeding a stream of material to be weighed into said receptacle, a motor (44) for driving said feeding means, a clutch (C) interposed between said motor and feeding means, means (141) responsive to the depression of said receptacle under a definite weight of material for opening said clutch, a constantly rotating member (54) driven by said motor, means for closing said clutch through motion derived from said rotating member, means for synchronizing the rotation of said rotating member with the speed of filling of said container comprising a variable speed gearing (B) interposed between said motor and rotating member, means (190) for discharging the weighed portion of material from the receptacle, and means (210) actuated through motion derived from said rotating member for opening said last named discharging means subsequent to the opening of said clutch.

28. In an automatic weighing machine, a scale (124), a receptacle (120) on said scale, means (95) for discharging a stream of the material to be weighed into said receptacle, means (155) responsive to the depression of said receptacle under a definite load for cutting off said stream, a motor (44), a continuously rotating member (54) driven by said motor, means (181) actuated by said continuously rotating member for returning said cutting off mechanism to its inoperative position, means for synchronizing said rotating member with the speed of filling of said receptacle comprising a variable speed gearing (B) interposed between said rotating member and said motor, means (190) for discharging the weighed portion of material from the receptacle, and means (210) actuated through motion derived from said rotating member for opening said receptacle discharge means subsequent to the cutting off of the stream of material into said receptacle.

29. In an automatic weighing machine, a scale (124), a receptacle (120) on said scale, means (95) for discharging a stream of the material to be weighed into said receptacle, means (155) responsive to the depression of said receptacle under a definite load for cutting off said stream, a motor (44), a continuously rotating member (54) driven by said motor, means (181) actuated by said continuously rotating member for returning said cutting off mechanism to its inoperative position, means for synchronizing said rotating member with the speed of filling of said receptacle comprising a variable speed gearing (B) interposed between said rotating member and said motor, means (190) for discharging the weighed portion of material from the receptacle, means (210) actuated through motion derived from said rotating member for opening said receptacle discharge means subsequent to the cutting off of the stream of material into said receptacle, a step-by-step conveyor adapted to carry a series of containers below said receptacle discharge means, means for driving said conveyor from said motor and means (D) for advancing said conveyor step-by-step through motion controlled by said rotating member.

30. In an automatic weighing machine, a scale (124), a receptacle (120) on said scale, means (94) for positively feeding a stream of material to be weighed into said receptacle, a motor (44) for driving said feeding means, a clutch (C) interposed between said motor and feeding means, means (141) responsive to the depression of said receptacle under a definite weight of material for opening said clutch, a constantly rotating member (54) driven by said motor, means for closing said clutch through motion derived from said rotating member, and means for rendering the machine inoperative comprising a manually operable clutch (A) between said motor and said constantly rotating member.

31. In an automatic weighing machine, a scale (124), a receptacle (120) on said scale, means (94) for positively feeding a stream of material to be weighed into said receptacle, a motor (44) for driving said feeding means, a clutch (C) interposed between said motor and feeding means, means (141) responsive to the depression of said receptacle under a definite weight of material for opening said clutch, a constantly rotating member (54) driven by said motor, means for closing said clutch through motion derived from said rotating member, means (190) for discharging the weighed portion of material from the receptacle, means (210) actuated through motion derived from said rotating member for opening said last named discharging means subsequent to the opening of said clutch and means for rendering the machine inoperative comprising a manually operable clutch (A) between said motor and said constantly rotating member.

32. In an automatic weighing machine, a scale (124), a receptacle (120) on said scale, means (95) for discharging a stream of the material to be weighed into said receptacle, means (155) responsive to the depression of said receptacle under a definite load for cutting off said stream, a motor (44), a continuously rotating member (54) driven by said motor, means (181) actuated by said continuously rotating member for returning said cutting off mechanism to its inoperative position, means (190) for discharging the weighed portion of material from the receptacle, means (210) actuated through motion derived from said rotating member for opening and closing said receptacle discharge means subsequent to the cutting off of the stream of material into said receptacle and means for rendering the machine inoperative comprising a manually operable clutch (A) between said motor and said constantly rotating member.

33. In an automatic weighing machine, a scale (124), a receptacle (120) on said scale, means (95) for discharging a stream of the material to be weighed into said receptacle, means (155) responsive to the depression of said receptacle under a definite load for cutting off said stream, a motor (44), a continuously rotating member (54) driven by said motor, means (181) actuated by said continuously rotating member for returning said cutting off mechanism to its inoperative position, means for synchronizing said rotating member with the speed of filling of said receptacle comprising a variable speed gearing (B) interposed between said rotating member and said motor, means (190) for discharging the weighed portion of material from the receptacle and means (210) actuated through motion derived from said rotating member for opening said receptacle discharge means subsequent to the cutting off of the stream of material into said receptacle, a step-by-step conveyor adapted to carry a series of containers below said receptacle discharge means, means for driving said conveyor from said motor and means for rendering the machine inoperative comprising a manually operable clutch (A) between said motor and said constantly rotating member.

34. In a weighing and filling machine, a step-by-step endless conveyor chain (218), a plurality of pairs of jaws (269) carried by said chain, and each pair of jaws being adapted to receive and support the mouth of a bag (217) or the like, spring means (275) for holding said jaws in an open position, manually operable latch means (278) for holding said jaws in a closed position and means for filling said bags with weighed portions of the material to be weighed as they are conveyed by said conveyor.

35. In a weighing and filling machine, a step-by-step endless conveyor chain (218), a plurality of pairs of jaws (269) carried by said chain, and each pair of jaws being adapted to receive and support the mouth of a bag (217) or the like, spring means (275) for holding said jaws in an open position, manually operable latch means (278) for holding said jaws in a closed position, means for filling said bags with weighed portions of the material to be weighed as they are conveyed by said conveyor and means (292) at the discharge end of the machine for lifting said jaws free of the mouths of the filled bags through motion derived from said conveyor chain.

36. In a weighing and filling machine, a step-by-step endless conveyor chain (218), a plurality of pairs of arms (263, 264) projecting outwardly from said conveyor chain, a vertically rising arm (267) pivoted to the end of each of said first arms (218) a vertically projecting roller (294) on each of said vertically rising arms and adjacent the pivotal connection thereof, a jaw (269) carried by each of said vertically rising arms, each pair of said jaws being adapted to receive the mouth of a bag (217) or the like, spring means (275) for yieldingly holding said jaws separated and in engagement with the mouths of said bags, means for filling the bags on said conveyor with weighed portions of the material to be weighed, a stationary rail (292) at the discharge end of the machine, said rail being adapted to engage said rollers and lift said jaws free of the filled bags.

37. In a weighing and filling machine, a step-by-step endless conveyor chain (218), a plurality of pairs of jaws (269) carried by said chain, and each pair of jaws being adapted to receive and support the mouth of a bag (217) or the like, spring means (275) for holding said jaws in an open position, manually operable latch means (278) for holding said jaws in a closed position, means for filling said bags with weighed portions of the material to be weighed as they are conveyed by said conveyor and means (286) at the feeding end of the machine for closing said jaws and engaging the latch means through motion derived from said conveyor chain thereby to permit of the ready application of bags thereto.

38. In a weighing and filling machine, a step-by-step endless chain (218), a plurality of pairs of arms (263, 264) pivotally carried by said chain, a jaw (269) at the outer end of each of said arms, each pair of said jaws being adapted to receive the mouth of a bag (217) or the like, spring means (275) for yieldingly holding said jaws separated and in engagement with the mouths of said bags, a link (276) connecting the inner end of the trailing arm (264) with the outer end of the advancing arm (263), a manually releasable latch bar (278) for holding said jaws closed, the inner end of the said trailing arm (264) being extended inwardly further than the companion arm (263), means for filling the bags on said conveyor chain with weighed portions of the material to be weighed, a stationary rail (286) within said chain, said rail being adapted to engage and retard the extended rear end of the trailing arm (264) of each pair and through the said link (276) effect a contraction of the said jaws and a latching of said jaws in their closed position by the said latch bar (278).

In testimony whereof I hereby affix my signature.

ROBERT N. CUNDALL.